US012441597B2

(12) United States Patent
Fantappie et al.

(10) Patent No.: US 12,441,597 B2
(45) Date of Patent: Oct. 14, 2025

(54) BEVERAGE DISPENSER

(71) Applicant: DRINKSTATION HOLDINGS CORPORATION, Las Vegas, NV (US)

(72) Inventors: Giancarlo Fantappie, Rancho Palos Verdes, CA (US); Steven T. Jersey, Laguna Niguel, CA (US); Farshad Kamali, Los Angeles, CA (US)

(73) Assignee: DRINKSTATION HOLDINGS CORPORATION, Las Vegas, NV (US)

( * ) Notice: Subject to any disclaimer, the term of this patent is extended or adjusted under 35 U.S.C. 154(b) by 0 days.

(21) Appl. No.: 18/466,235

(22) Filed: Sep. 13, 2023

(65) Prior Publication Data

US 2023/0416070 A1 Dec. 28, 2023

Related U.S. Application Data

(63) Continuation of application No. 17/384,352, filed on Jul. 23, 2021, now Pat. No. 11,802,036.
(Continued)

(51) Int. Cl.
*B67D 1/00* (2006.01)
*B67D 1/08* (2006.01)

(52) U.S. Cl.
CPC ......... *B67D 1/0034* (2013.01); *B67D 1/0044* (2013.01); *B67D 1/0058* (2013.01);
(Continued)

(58) Field of Classification Search
CPC .. B67D 1/0034; B67D 1/0044; B67D 1/0058; B67D 1/0071; B67D 1/0888; B67D 1/0029
See application file for complete search history.

(56) References Cited

U.S. PATENT DOCUMENTS

| | | | | |
|---|---|---|---|---|
| 4,886,190 A | 12/1989 | Kirschner et al. | | |
| 10,730,735 B2 * | 8/2020 | Cook | .................. | B67D 1/1252 |

(Continued)

FOREIGN PATENT DOCUMENTS

| | | | | |
|---|---|---|---|---|
| WO | 2009036912 A2 | 3/2009 | | |
| WO | WO-2011090805 A1 * | 7/2011 | ........... | B67D 1/0021 |

(Continued)

OTHER PUBLICATIONS

International Search Report in PCT/US2021/043045, mailed Dec. 28, 2021, 6 pages.

*Primary Examiner* — Paul R Durand
*Assistant Examiner* — Michael J. Melaragno
(74) *Attorney, Agent, or Firm* — STETINA GARRED BRUCKER & NEWBOLES

(57) ABSTRACT

A beverage dispenser uses-high ratio concentrates to mix on-demand beverages. The high-ratio concentrate is pre-mixed with an alkaline water to allow for improved blending performance in the final beverage. The beverage recipe may be customized by the user to suit personal tastes. Aspects of the beverage dispenser also may include the ability to dispense room temperature, chilled, heated, sparkling, or highly alkaline beverages. Operation of a user interface to receive a beverage order includes the ability to display and employ user interfaces present on both a display on the beverage dispenser and an application on a mobile device. In some aspects, both user interfaces may be used simultaneously to receive user input. Methods of dispensing a beverage using the beverage dispensing systems are also discussed.

11 Claims, 22 Drawing Sheets

Related U.S. Application Data

(60) Provisional application No. 63/056,178, filed on Jul. 24, 2020.

(52) U.S. Cl.
CPC ......... *B67D 1/0071* (2013.01); *B67D 1/0888* (2013.01); *B67D 1/0029* (2013.01)

(56) References Cited

U.S. PATENT DOCUMENTS

| | | | | |
|---|---|---|---|---|
| 11,802,036 | B2 * | 10/2023 | Fantappie | B67D 1/0044 |
| 2009/0071890 | A1 * | 3/2009 | Oranski | C02F 9/20 210/234 |
| 2011/0166699 | A1 * | 7/2011 | Palmquist | B67D 3/0041 222/23 |
| 2011/0181417 | A1 * | 7/2011 | Haskayne | B67D 1/0021 340/572.1 |
| 2011/0210068 | A1 * | 9/2011 | Lalor | C02F 9/20 210/636 |
| 2012/0042682 | A1 * | 2/2012 | Cominski | B67D 1/0009 62/389 |
| 2013/0068109 | A1 * | 3/2013 | Pribus | B65D 85/8052 426/77 |
| 2013/0071532 | A1 * | 3/2013 | Pribus | A47J 31/407 426/431 |
| 2013/0129870 | A1 * | 5/2013 | Novak | B01F 23/2363 426/115 |
| 2013/0189400 | A1 * | 7/2013 | Pribus | B65D 85/8055 426/115 |
| 2014/0144828 | A1 * | 5/2014 | Chiu | C02F 1/66 210/282 |
| 2015/0239725 | A1 * | 8/2015 | Watts | B67D 3/02 222/400.8 |
| 2017/0367522 | A1 * | 12/2017 | Ackel | A47J 31/41 |
| 2018/0354771 | A1 * | 12/2018 | Wyatt | B67D 1/108 |
| 2020/0331743 | A1 * | 10/2020 | Cook | B67D 1/14 |
| 2020/0361758 | A1 * | 11/2020 | Fantappié | B67D 1/10 |
| 2022/0024748 | A1 * | 1/2022 | Fantappie | B67D 1/0078 |

FOREIGN PATENT DOCUMENTS

| | | | | |
|---|---|---|---|---|
| WO | 2013154716 | A1 | 10/2013 | |
| WO | WO-2015168290 | A1 * | 11/2015 | B67D 1/0036 |

* cited by examiner

BEVERAGE DISPENSER

TECHNICAL FIELD

The present disclosure relates to systems and methods for dispensing post-mix beverages.

BACKGROUND

Recent advances in post-mix beverage dispensing make it possible for end users to customize the beverage that is dispensed. Users may add additional flavorings and enhancements (e.g., vitamins, caffeine, and dietary supplements) to existing beverages, and can also modify the amount of an ingredient found in a preexisting beverage recipe to suit their personal tastes. At the same time, there has been an increase in demand for healthier beverage options, which has led to the rising popularity of flavored water beverages. These flavored water beverages are typically lightly flavored water that may or may not also be carbonated. User demand for these types of beverages has also expanded outside typical food-service establishments and restaurants, to include non-typical dispensing environments such as smaller office kitchens, in-home applications, and other commercial spaces that do not typically include beverage dispensers (e.g., waiting rooms and lobbies).

Existing post-mix beverage dispensers typically consume relatively large amounts of concentrated syrup to create the on-demand beverages. Adding the ability to customize beverages requires a wider range of concentrates be stored in the dispenser, which in existing dispensers results in a large dispenser footprint due to the onboard storage required to store the syrup. These large dispensers are difficult to place in locations with limited space, such as those dispensing environments described above. Therefore, there exists a need for a beverage dispenser that is capable of producing customized beverages with a smaller footprint capable of placement in locations with less available space. To further improve the end user experience, this beverage dispenser should also be easily serviceable by the end user or by an office manager in an office. Therefore, there exists a need for easily accessible and quick replaceable consumables (e.g., water filter, alkaline chamber, carbon dioxide gas canister and flavoring concentrate containers).

BRIEF SUMMARY

In an aspect a beverage dispenser includes a housing; a water source fluidly connected to the housing; and an alkaline chamber disposed in the housing and fluidly connected to the water source, wherein the alkaline chamber is configured to receive water from the water source and output alkaline water with an alkalinity greater than the water received from the water source. A concentrate pump is disposed in the housing and fluidly connected to the alkaline chamber; and a concentrate container is removably disposed in the housing and fluidly connected to the concentrate pump. A nozzle is disposed on the housing and configured to dispense a beverage, wherein the concentrate pump is configured to pump a concentrate from the concentrate container and the alkaline water to the nozzle such that the concentrate mixes with the alkaline water before reaching the nozzle, wherein the nozzle is also fluidly connected to the water source separately from the combined flavoring concentrate and water output from the alkaline chamber, and wherein the nozzle is configured to mix water from the water source with the combined concentrate and alkaline water prior to dispensing the beverage.

Further aspects of a beverage dispenser include a housing; a water source fluidly connected to the housing; and a nozzle disposed on the housing and configured to dispense a beverage. A water chiller is disposed in the housing and includes a fluid tight container filled with a water bath, a cooling element disposed in the water chiller and configured to chill the water bath. A cooling coil is disposed in the water chiller such that the cooling coil is in contact with the water bath, wherein the cooling coil is fluidly connected to the water source to receive water from the water source and is configured to output chilled water, and wherein the cooling coil is fluidly connected to route chilled water to the nozzle through a chilled water line. A gas source that includes a container that stores a pressurized gas is removably disposed in the housing. A carbonator tank or canister which contains carbon dioxide (i.e. CO2) gas under pressure, is disposed in the housing, or externally connected to the housing, and fluidly connected to both an output of the cooling coil and the gas source, wherein the carbonator chamber is configured to blend the pressurized gas with the chilled water such that at least some of the pressurized gas dissolves in the chilled water to produce sparkling water, wherein the carbonator chamber is fluidly connected to the nozzle to route the sparkling water to the nozzle. In some aspects, a water heater is disposed in the housing and is fluidly connected to the water source to receive and store water in a water tank and heat the stored water using a heater element disposed in the water tank or, alternatively, heat the water using an in-line heat exchanger, wherein the water heater is fluidly connected to the nozzle to route the heated water to the nozzle. An alkaline chamber is disposed in the housing and is fluidly connected to the water source, wherein the alkaline chamber is configured to receive water from the water source and output alkaline water with an alkalinity greater than the water received from the water source, wherein the alkaline chamber is fluidly connected to the nozzle to route the alkaline water to the nozzle. In some aspects, a concentrate pump is disposed in the housing and fluidly connected to the alkaline chamber. A concentrate container is removably disposed in the housing and fluidly connected to the concentrate pump, wherein the concentrate pump is configured to pump a concentrate from the concentrate container and the alkaline water to the nozzle such that the concentrate mixes with the alkaline water before reaching the nozzle, wherein the nozzle is also fluidly connected to the water source separately from the combined flavoring concentrate and water output from the alkaline chamber, and wherein the nozzle is configured to mix water from the water source with the combined concentrate and alkaline water prior to dispensing the beverage. In some aspects of the beverage dispenser, a dedicated alkaline pump is fluidly connected to the alkaline chamber, a concentrate pump is fluidly connected to the concentrate container, with the two pumps operating independently and mixing a predetermined amount of flavor concentrate with alkaline water before directing the mixed flow to the nozzle.

In some aspects of the beverage dispenser, the water from the water source is filtered by a water filter inside the housing or is filtered before entering the housing. The water filter, the carbonator canister, the alkaline chamber and the concentrate container to constitute the set of replaceable consumables of the beverage dispenser according to certain aspects. Replaceable consumables to be easily removable when exhausted and fast replaceable by any unskilled user of the beverage dispenser.

A method of dispensing a beverage from a beverage dispenser according to an aspect includes receiving water from a water source in a housing of a beverage dispenser; increasing the alkalinity of a first stream of the water by passing the water through an alkaline chamber disposed in the housing; combining a flavoring concentrate with the first stream of alkaline water to form a first combination of alkaline water and flavoring concentrate; receiving this first combination at a nozzle disposed on the housing; receiving a second stream of water from the water source at the nozzle; combining the first combination with the second stream of water in the nozzle to form the beverage; and dispensing the beverage from the nozzle.

A method of ordering a beverage from a beverage dispenser, according to an aspect includes selecting a type of beverage to be dispensed from a user interface disposed on either a display of a beverage dispenser or an application on a mobile device of a user or both; initiating dispensing of the selected beverage by inputting a start command on the user interface disposed on either the display of a beverage dispenser or the application on the mobile device of the user; stopping dispensing of the selected beverage by inputting a stop command on either the user interface disposed on either the display of a beverage dispenser or the application on the mobile device of the user.

BRIEF DESCRIPTION OF THE DRAWINGS/FIGURES

The accompanying drawings, which are incorporated herein and form part of the specification, illustrate aspects of the present disclosure and, together with the description, further serve to explain the principles of the disclosure and to enable a person skilled in the relevant art to make and use the disclosure.

DETAILED DESCRIPTION

Figure 1:
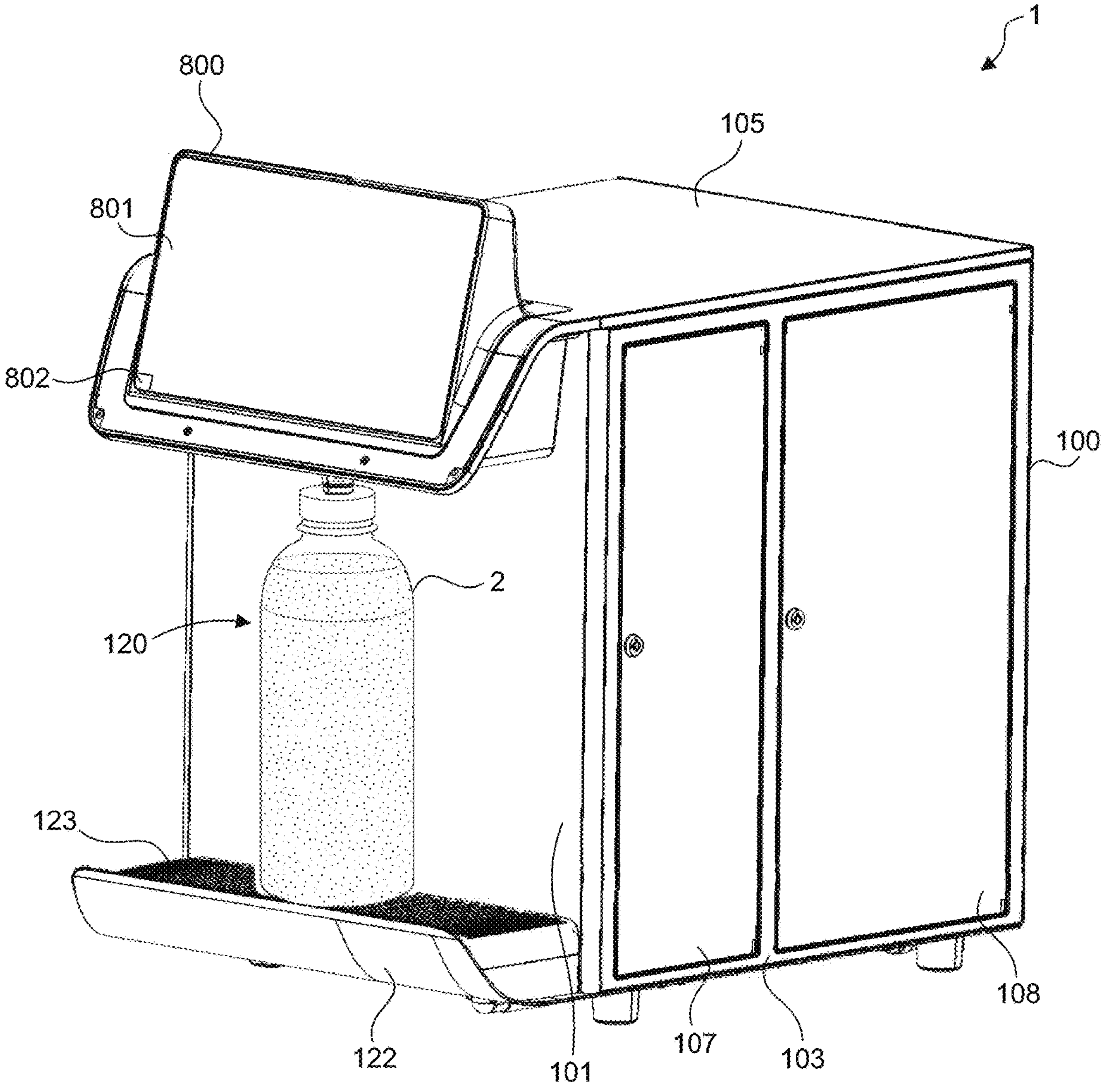
FIG. 1 is a perspective view of a beverage dispenser according to an aspect.

The present disclosure will now be described in detail with reference to aspects thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspect whether or not explicitly described.

Consumer demand for wide variety of low-calorie flavored water beverages in non-typical vending locations, such as home or office settings, requires a compact dispenser that find its place in small kitchens and break-rooms and that is capable of delivering a variety of post-mix beverages. Furthermore, a user should be able to add additional flavorings and enhancements to their beverages, varying mixing and level of concentration, and also customize various aspects of their beverage, such as beverage temperature or carbonation level. A compact beverage dispenser used in these non-food service settings, although compact, should nevertheless be capable of storing multiple different flavorings and enhancements to allow for a wider product selection. Finally, the non-typical locations are not usually serviced by trained maintenance technicians, and therefore the dispenser should be serviceable, at least by allowing replacement of consumables, by an end user with minimal or no training.

In an aspect, a beverage dispenser according to this disclosure meets at least some of the foregoing requirements and includes a housing; a water source fluidly connected to the housing; an alkaline chamber disposed in the housing and fluidly connected to the water source, wherein the alkaline chamber is configured to receive water from the water source and output water with an alkalinity greater than the water received from the water source; a nozzle disposed on the housing and configured to dispense a beverage, wherein the nozzle is fluidly connected to the water source; and a flavoring concentrate container removably disposed in the housing and fluidly connected to the alkaline chamber such that a flavoring concentrate from the flavoring concentrate container mixes with the water output form the alkaline chamber. The combination of the flavoring concentrate and the water output from the alkaline chamber is fluidly connected to the nozzle, and the nozzle is also fluidly connected to the water source separately from the combined flavoring concentrate and water output from the alkaline chamber. The nozzle is configured to mix water from the water source with the combined flavoring concentrate and water output from the alkaline chamber prior to dispensing the beverage.

Referring to FIGS. 1-4, an aspect of a beverage dispenser 1 includes a housing 100. As illustrated in the Figures, housing 100 (also called cladding 100) may be formed as a rectangular prism, with a front wall 101, rear wall 102, right wall 103, left wall 104, top wall 105, and bottom wall 106 (collectively, "the housing walls"). Housing 100 may also be formed in non-rectangular shapes, such as cylindrical, spherical, or other prismatic shapes with more than six sides. The housing walls may be formed from one continuous element, or may be formed from multiple elements (e.g., sheets of metal, or plastic partitions) joined together. Furthermore, the housing walls may include openings to access the interior of housing 100, and may also include attachment points for elements mounted on the exterior or interior surfaces of the walls. The housing walls may be formed from any suitable material, including, for example, aluminum, steel, and plastic materials. The housing walls may be joined together using any suitable method, such as adhesives, welding, or mechanical fastening or connectors.

Figure 2:
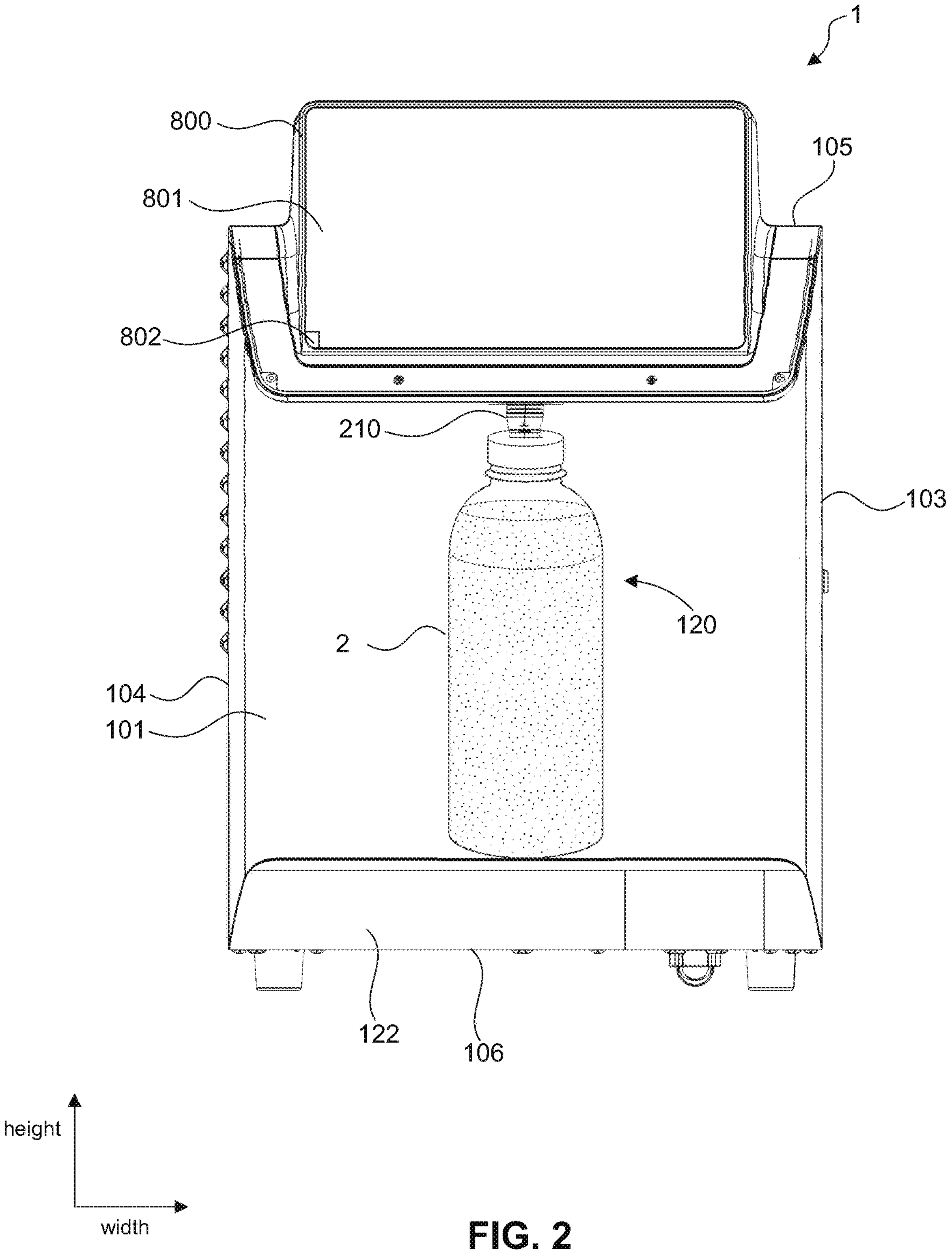
FIG. 2 is a front view of a beverage dispenser according to an aspect.
Figure 3:
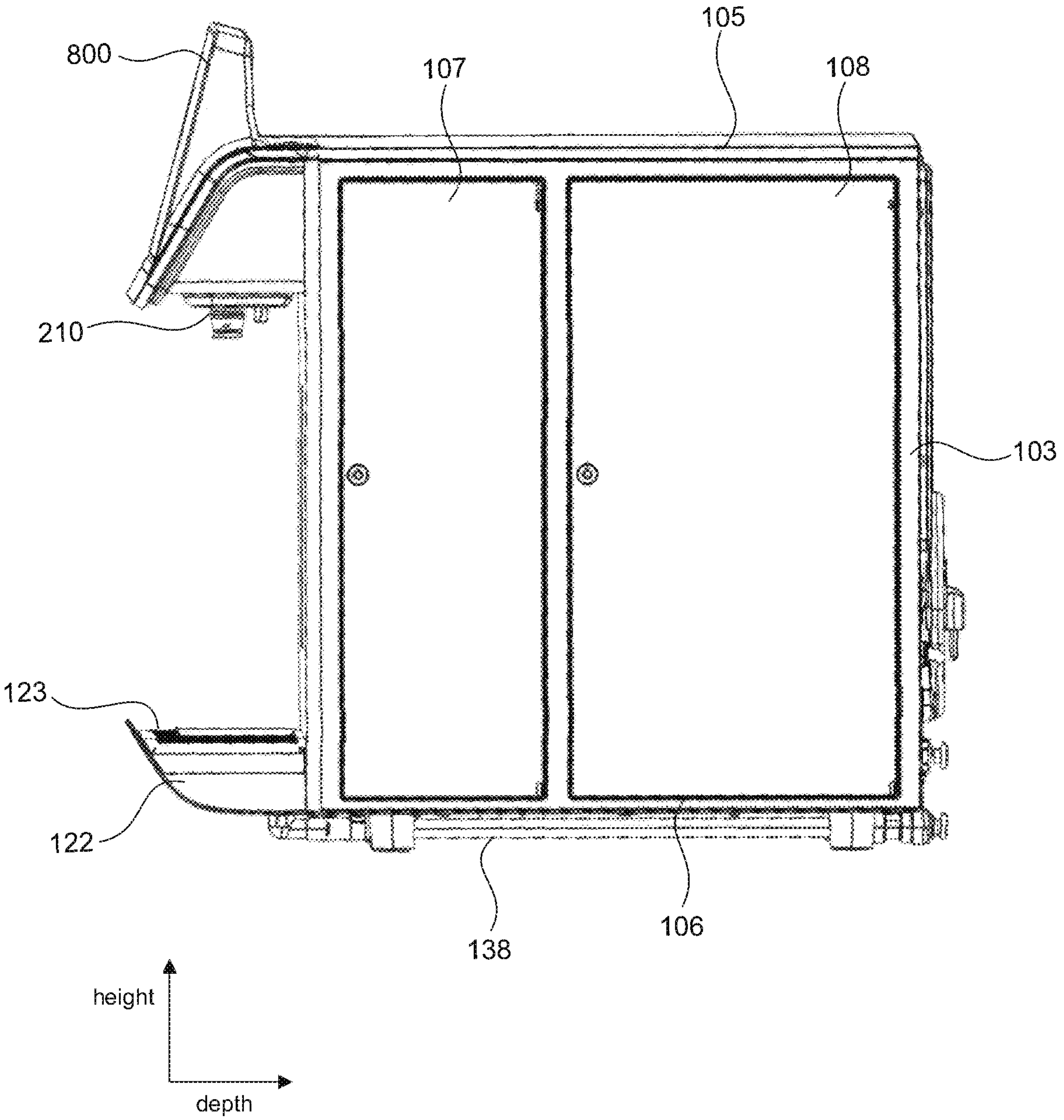
FIG. 3 is a side view of a beverage dispenser according to an aspect.

For purposes of this disclosure and solely for ease of reference, directions as illustrated in FIGS. 2-3 are defined as follows. The height direction is the direction extending perpendicular to top wall 105 and bottom wall 106, the width direction is the direction extending perpendicular to right wall 103 and left wall 104, and the depth direction is the direction extending perpendicular to front wall 101 and rear wall 102.

In some aspects, housing 100 may be sized to be suitable for placement in a non-typical dispenser location, such as, for example, on a countertop in an office pantry, break-room or home kitchen. Counters have a standard depth of 60 centimeters (23.6 inches). Most kitchens counters have wall-cabinets built above the counters at a height that, in some cases, is as low as 16 inches. In addition, space on the counter is limited and a dispenser larger than 18 inches would be too wide for most home kitchens. For those reasons, in some aspects, housing 100 may not exceed 16 inches in the height direction, 18 inches in the width direction, and 23 inches in the depth direction. Furthermore, in these aspects beverage dispenser 1 may weigh less than 45 pounds without any onboard removable consumables present. These aspects have the advantage or being easily positioned in non-typical locations, such as the aforementioned countertops. As will be discussed in detail below, these compact aspects of beverage dispenser 1, include all components required to dispense a beverage inside housing 100. Specifically, none of the consumables (e.g., beverage concentrate, CO2 gas canisters, alkaline chambers and water filters) or dispensing elements (e.g., pumps, valves) are located outside of housing 100. These aspects of beverage dispenser 1 still require an external connection to power and water source to function.

As best shown in FIGS. 1 and 2, beverage dispenser 1 includes a dispensing zone 120 that is configured to receive a container 2. A nozzle 210 is disposed on front wall 101 in the dispensing zone 120. A drip tray 122 is also disposed on front wall 101 in dispensing zone 120. Drip tray 122 includes a surface 123 configured to support container 2 under nozzle 210 while it is being filled. Surface 123 includes openings to form a grid that allow any drips or spills to drain through surface 123 into the body of drip tray 122. A display 800 is also disposed on front wall 101 above nozzle 210. Display 800 will be described in detail below.

Figure 3A:
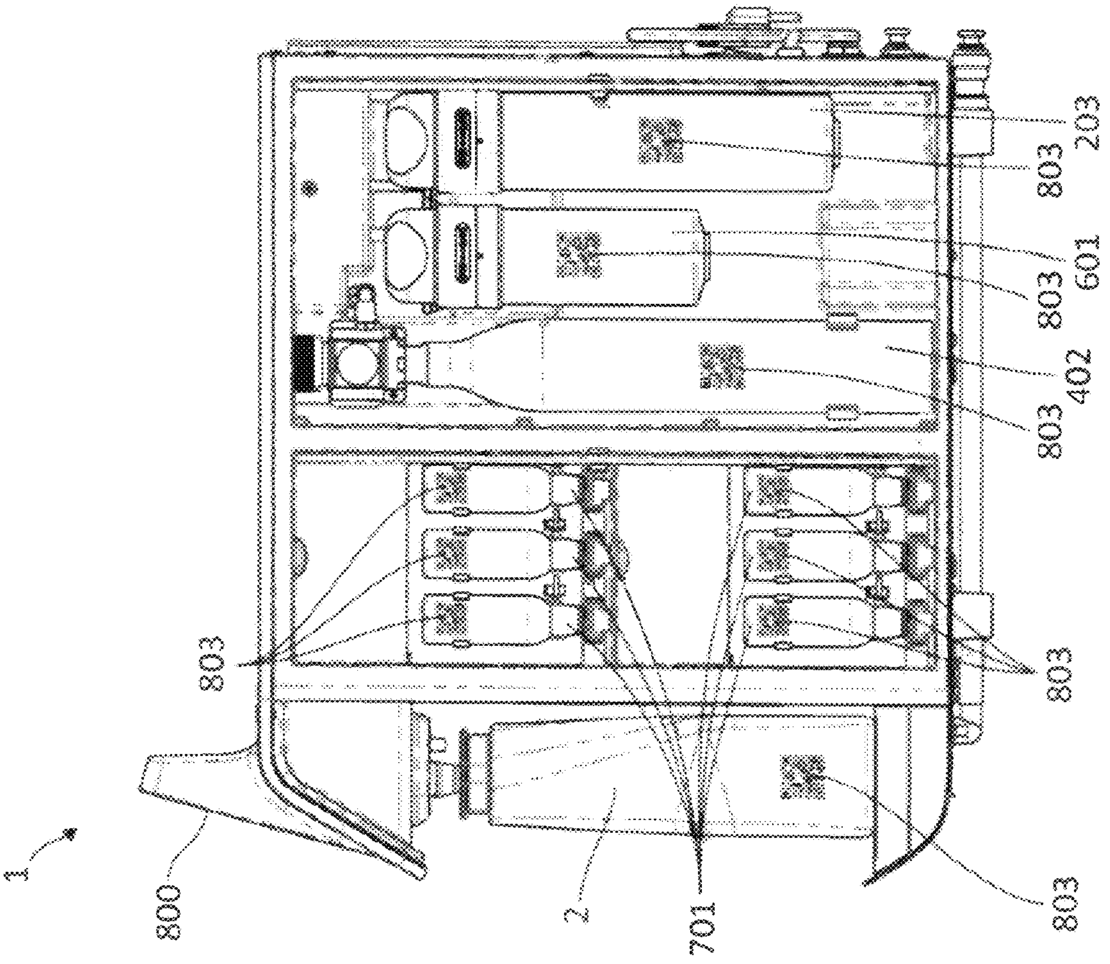
FIG. 3A is the side view of FIG. 3 showing replaceable consumables, according to an aspect.

As shown in FIGS. 3 and 3A, in some aspects, housing 100 includes access doors 107 and 108 (on right wall 103). Access doors 107 and 108 (collectively, "the access doors") cover openings in their corresponding walls that enable a user to access the interior of housing 100 to access the replaceable consumables of beverage dispenser 1. The access doors may be made from any suitable material and are removably fastened to their corresponding wall using hinges, mechanical fasteners, or any other suitable method for removably attaching the access doors. Doors may be locked in the closed position with keys or stay in the closed position with a magnet or other latching mechanisms. FIG. 3A is the side view of FIG. 3 with access doors 107 and 108 removed to show an example arrangement of the removable consumables accessible through the access doors. As shown in FIG. 3A, inside access door 107 six concentrate containers 701 are shown (described in detail below), and inside access door 108 one CO2 gas canister 402, one alkaline chamber 601 and one water filter 203 are shown (described in detail below). Each of these consumables are easily accessible and quick replaceable by any unskilled user when empty or exhausted. As will be described below, the number and type of consumables present in housing 100 can vary depending on the features and capabilities present in a specific aspect of beverage dispenser 1.

Figure 4:
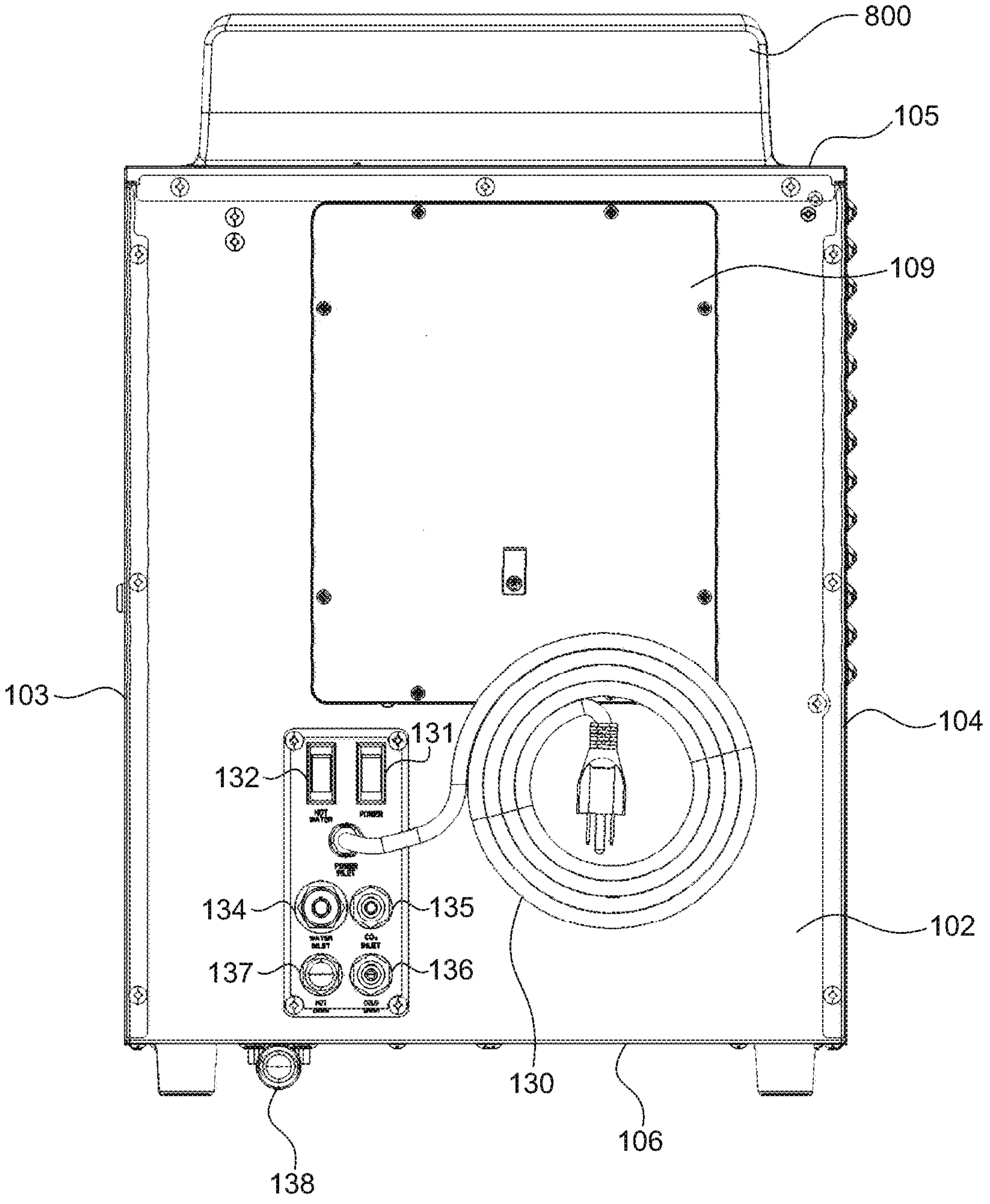
FIG. 4 is a rear view of a beverage dispenser according to an aspect.

As shown in FIG. 4, in some aspects rear wall 102 may include various external connections. Visible in the aspect shown in FIG. 4 is a power cord 130 that is configured to plug in to a suitable outlet to provide power to beverage dispenser 1. A power switch 131 and a hot water switch 132 control the flow of power to elements of beverage dispenser 1. A water inlet 134 is provided on rear wall 102 to receive ambient water from a water source. A CO2 inlet 135 is also provided on rear wall 102 to receive an external source of CO2 for carbonation purposes, if internal CO2 gas canister is deemed insufficient for a large community of people in a large office space. A cold water drain 136 and hot water drain 137 are also located on rear wall 102 to drain the water bath of the internal chiller and the hot water from the hot water tank, respectively, anytime the dispenser must be moved, relocated, or re-packaged and transported. Finally, a drip tray drain 138 is also shown in FIGS. 3 and 4. The purpose of these connections will be discussed in detail below. Some of these connections may be optional in some aspects of beverage dispenser 1, as will be discussed below. In addition, an access door 109 (on rear wall 102) serves to provide maintenance access for servicing interior components of housing 100, such as the main PCB board and the IoT communication board for cell, wireless and, bluetooth connectivity.

Figure 5A:
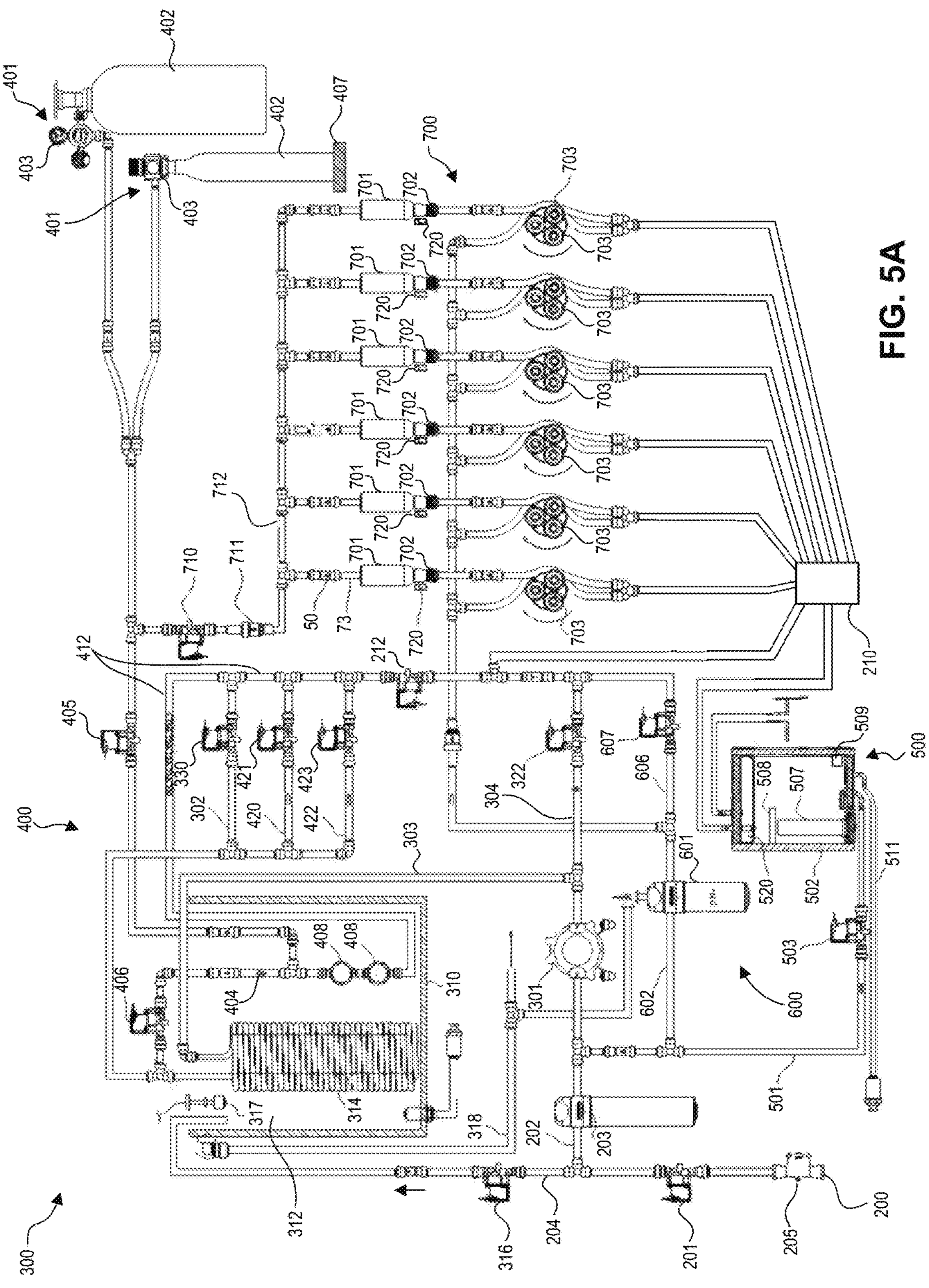
FIGS. 5A and 5B are schematic views of a beverage dispenser according to aspects.
Figure 5B:
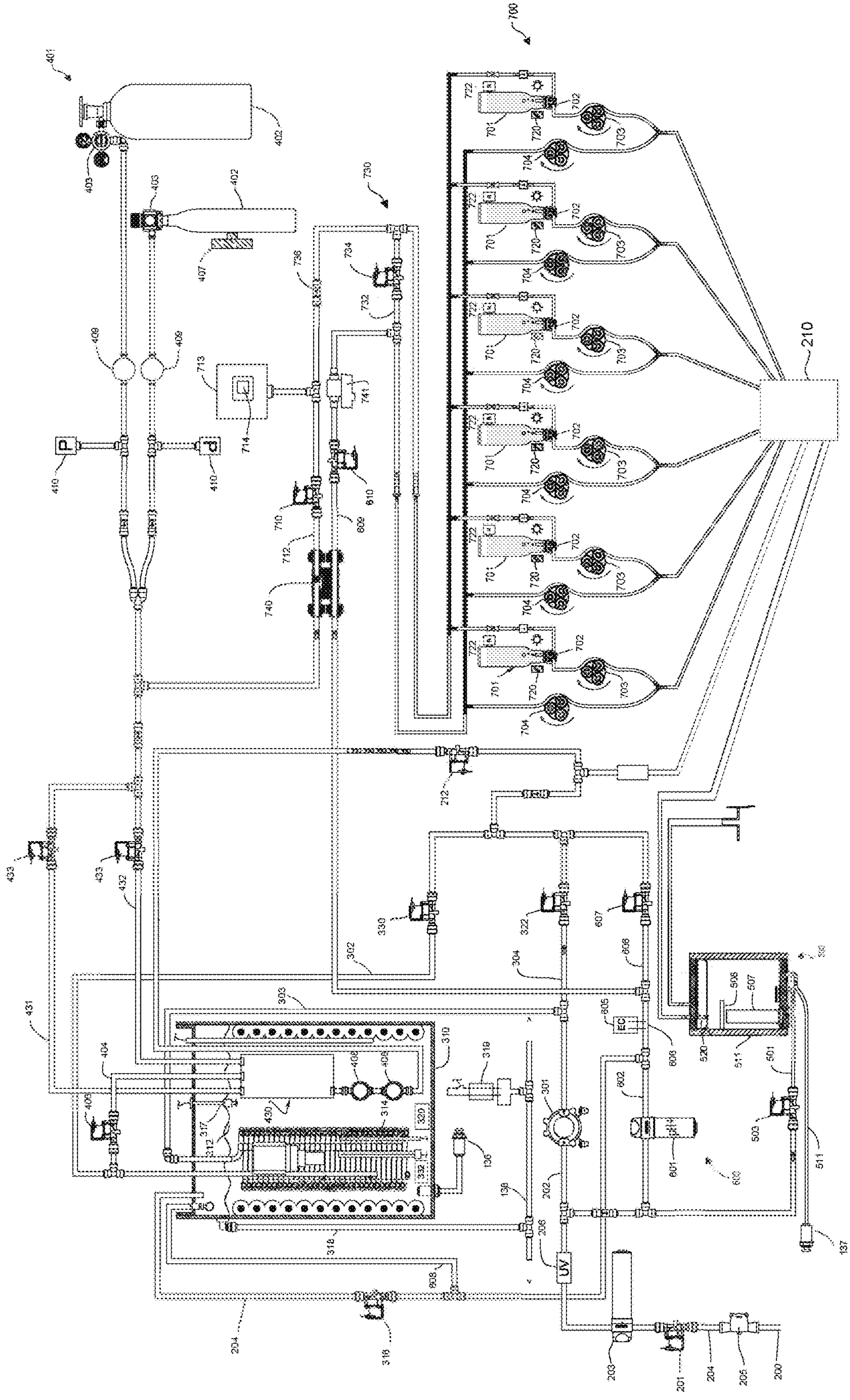

FIGS. 5A and 5B are views of a schematic representation of the plumbing arrangement of aspects of beverage dispenser 1. Both aspects of beverage dispenser 1 are capable of adjusting the composition of a beverage in four functional groups: the temperature of the beverage, the carbonation level of the beverage, the concentration of flavorings and/or enhancements in the beverage, and its alkalinity. The temperature adjustment is further subdivided into two separate functional groups: adjusting the temperature below ambient (i.e., chilling the beverage) and adjusting the temperature above ambient, (i.e., heating the beverage). Thus, there are a total of five functional groups discussed below: a cooling functional group 300, a sparkling functional group 400, a heating functional group 500, an alkaline functional group 600, and a flavoring and enhancement functional group 700. The organization of elements into these functional groups is done for clarity alone and does not require that a given element only be used for a corresponding function. It also should be understood that the numerals corresponding to these functional groups do not indicate any additional element or method step and are being used solely for organization purposes. The disclosure will address the plumbing of each of these functional groups in turn for clarity. Unless otherwise disclosed, all of the elements discussed with reference to FIGS. 5A-10B and the elements of these five functional groups are disposed entirely inside housing 100. Different aspects of beverage dispenser 1 may include some or all of the plumbing elements necessary for each functional group. For example, some aspects of beverage dispenser 1 may include all of the elements from each functional group. Other aspects of beverage dispenser 1 may include any desired combination of the elements of these functional groups.

As shown in FIGS. 5A-10B, beverage dispenser 1 receives a source of still water from a water supply 200. Water supply 200 is supplied by an external connection through water inlet 134 of FIG. 4. In some aspects, water supply 200 is a supply of pressurized, potable water from, for example, a city's municipal water, well water, water from a supply tank, or any other source of water. Also shown in FIGS. 5A-10B is a water supply valve 201 disposed immediately downstream from water supply 200. Water supply valve 201 is configured to open and close the flow of water supply to the remainder of beverage dispenser 1. The fluid control valves used in beverage dispenser 1, including a main water supply valve 201, may be any suitable type of electronically controlled valve. For example, in some aspects, the fluid control valves in beverage dispenser 1 are solenoid valves controlled by a controller 1000. Further details of the control schemes used by controller 1000 are discussed in detail below. A flow meter 205 may also be present after water supply 200 to provide water supply information to controller 1000. Flow meter 205 may be positioned upstream with respect to main water supply valve 201, (as shown in the plumbing diagram of FIGS. 5A and 5B), or downstream of main water supply valve 201.

Immediately downstream of water supply valve 201 the flow of water from water supply 200 splits into two paths. A first main path 202 leads to a water filter 203. Water filter 203 may be any suitable water filter designed to enhance the quality of the water from water supply 200 by filtering the water in order to improve taste, odor, and other aesthetic effects. For example, water filter 203 may be a combination particle filter (e.g., a 5 or 10 micron sediment-filter element) and a taste/odor filter (e.g., an activated carbon element) that filters particulate matter, chlorine, and chloramine dissolved in water and improves taste. In some other aspects of water filter 203, the above mentioned media may be complemented with additional media (e.g., nanofibers) to enhance the filtration capabilities of the water filters. In some aspects as shown in FIG. 5B an ultraviolet filter 206 can be disposed downstream of water filter 203. Ultraviolet filter 206 applies ultraviolet light to the water passing through it to improve water quality by neutralizing microbes, cysts, bacteria and viruses in the water. In some aspects, ultraviolet filter 206 can be integrated into water filter 203. Water filter 203 is removably disposed in housing 100 such that it is accessible to a user through one of access doors 107, 108 (as shown, for example, in FIG. 3A). In some aspects, water filter 203 is configured to be easily removed and replaced by an end user of beverage dispenser 1 by, for example, including a simplified attachment mechanism such as a—twist-and-lock attachment, coarse threads, push-in/push out, hinge-in/push-out, or a quick release connection. The output of water filter 203 is fluidly connected as the supply for the beverage dispensing components of beverage dispenser 1. In some aspects, all of the water that is dispensed as a beverage from beverage dispenser 1 is supplied from the output of water filter 203.

A second main path 204 leading from water supply valve 201 is fluidly connected to a water bath 312 of a chiller 310. This supply of water from water supply 200 is not filtered through water filter 203 and it is used to fill chiller 310 with water. The operation of chiller 310, including how it is filled through second main path 204, is discussed below.

Figure 6:
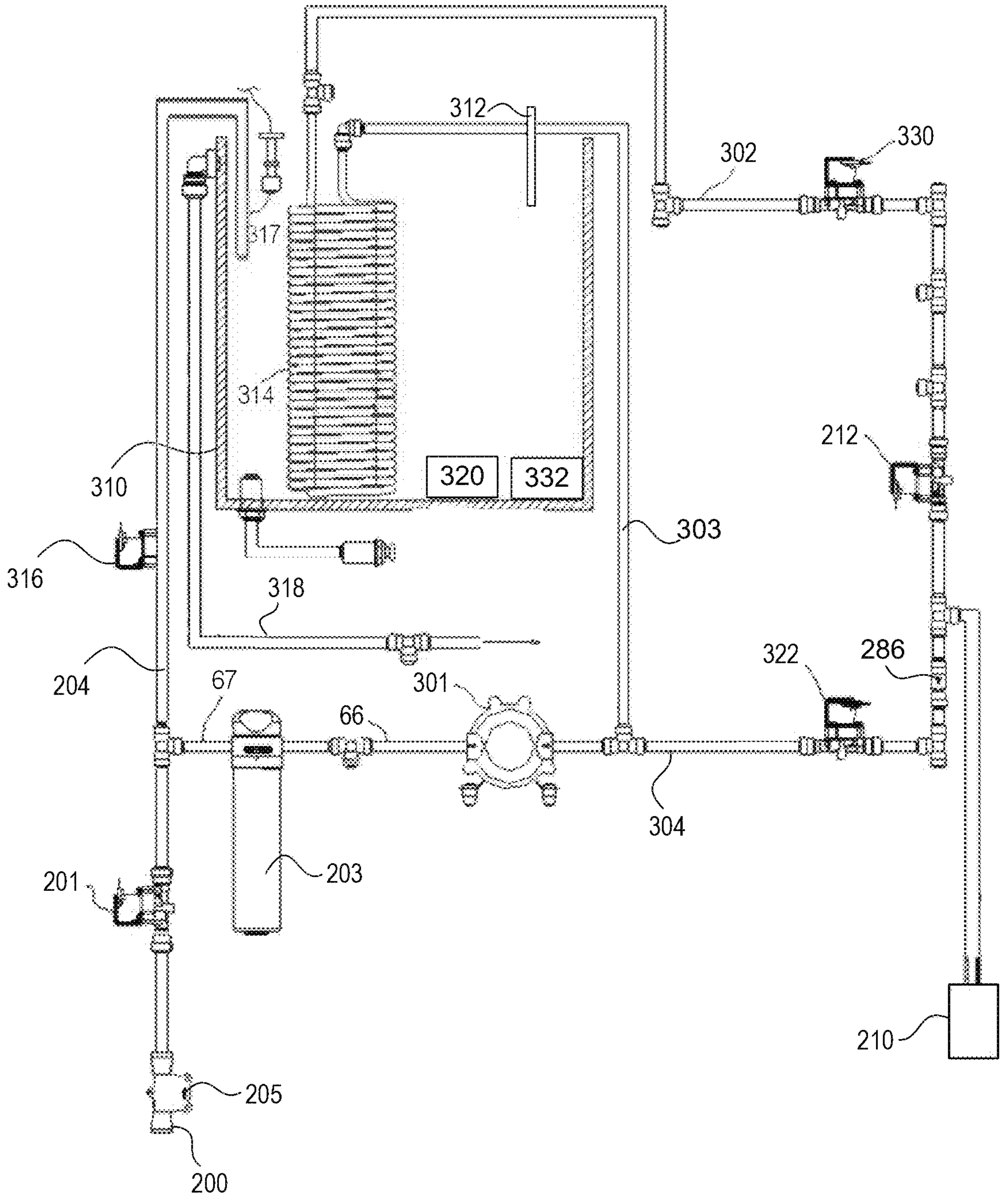
FIG. 6 is a schematic view of a beverage dispenser according to an aspect.

The operation of cooling functional group 300 of beverage dispenser 1 is discussed with reference to FIG. 6, which is a simplified diagram of the plumbing of beverage dispenser 1 that illustrates only the cooling elements for ease of explanation. As discussed in detail below, different aspects of beverage dispenser 1 may have some, or all, of the functional groups present (i.e., cooling, heating, carbonation, alkaline, and flavoring/enhancements). FIG. 6 illustrates cooling functional group 300 in isolation for clarity only, and should not be interpreted to suggest that an aspect of beverage dispenser 1 only includes the plumbing shown in FIG. 6.

As shown in FIG. 6, after flowing through water filter 203, water is routed to a pump 301. Water is pumped from pump 301 and is split into a first chilling path 303 and an ambient water path 304. First chilling path 303 routes water into a chilling coil 314 disposed in water bath 312 of chiller 310. Chiller 310 is a fluid-tight container that is filled with water from second main path 204 in FIG. 5A. In some aspects, controller 1000 automatically controls the level of water bath 312 in chiller 310 by actuating a water bath valve 316 disposed on second main path 204. To accomplish this, a water bath sensor 317 may be disposed in chiller 310 and may transmit the water level to controller 1000. When the level of water bath 312 is too low, controller 1000 opens water bath valve 316 to fill chiller 310. Also connected to chiller 310 is a water bath overflow drain 318 and a cold water drain 136 that can be used to empty chiller 310 when, for example, beverage dispenser 1 is being serviced or relocated. As shown in FIG. 5B, a drain sensor 319 can be connected to water bath overflow drain 318 to detect the presence of water. Drain sensor 319 can be connected to controller 1000, which can alert a user to the operation of water bath overflow drain 318.

A cooling element 320 is disposed in chiller 310 to cool water bath 312. Chilling coil 314 is configured to conduct heat between the water travelling in chilling coil 314 and water bath 312. Therefore, the cool temperature of water bath 312 cools the water flowing through chilling coil 314. Cooling element 320 may be any suitable cooling element. For example, cooling element 320 may be an evaporator coil linked to a compression refrigeration system. Cooling element 320 may also be a solid state thermoelectric cooler. In some aspects, cooling element 320 and the corresponding cooling system are configured to minimize both space and weight to improve portability of beverage dispenser 1. In some aspects, cooling element 320 is controlled by controller 1000 to maintain a desired temperature of water bath 312. In these aspects, a water bath temperature sensor 332 may be disposed in water bath 312 to transmit the temperature of water bath 312 to controller 1000.

After flowing through chilling coil 314, the now chilled water is routed through a chilled water valve 330 or, alternatively, through a sparkling water valve 406, an after-drip valve 212, and nozzle 210 in that order. After-drip valve 212 is disposed immediately upstream of nozzle 210 and is used to stop the flow of beverage dispensed from beverage dispenser 1. The position of after-drip valve 212 immediately upstream of nozzle 210 minimizes any beverage drips after dispensing has stopped because of the minimal volume of piping between after-drip valve 212 and nozzle 210.

Ambient water path 304 fluidly connects pump 301 to an ambient water valve 322, and nozzle 210 in that order. The water flowing through ambient water path 304 to nozzle 210 is not chilled from the ambient temperature of the water received at water supply 200: a check valve 286 in FIG. 6 prevents chilled water from entering into the ambient water line when chilled water is dispensed.

The water flowing through first chilling path 303 and ambient water path 304 can be combined to create still water of three different temperatures at nozzle 210. The coldest temperature water is dispensed when water is only allowed to flow through first chilling path 303 to nozzle 210. Ambient temperature water is dispensed when water is only allowed to flow through ambient water path 304 to nozzle 210. An intermediate temperature water is dispensed when water is allowed to flow through both first chilling path 303 and ambient water path 304 to nozzle 210 simultaneously (e.g., valves 330 and 332 contemporarily open). The specific temperature of the intermediate water dispensed is controlled by the relative flow rates of the water in first chilling path 303 and ambient water path 304. A higher flow rate in first chilling path 303 will result in colder water, and a higher flow rate in ambient water path 304 will result in warmer water. The flow rates in first chilling path 303 and ambient water path 304 may be controlled by balancing the pump output pressure and the diameter of the piping comprising the first chilling path 303 and ambient water path 304. In some aspects, flow restrictors may be inserted into one or both of first chilling path 303 and ambient water path 304. Flow restrictors are elements that have a narrower diameter than that of the piping in the corresponding flow path. This narrower diameter can be selected to precisely tailor the flow rate through the corresponding flow path. Thus, the temperature of the intermediate water dispensed when both flow paths are open can be controlled by tailoring the flow rates in both flow paths using one or more flow restrictors. In one aspect, the flow restrictor is positioned in the ambient water path 304 before the ambient water valve 322. In some aspects, flow restrictors present in one or both of first chilling path 303 and ambient water path 304 may be actively controlled by controller 1000 to tailor the flow rates, and thus resulting temperature, of the intermediate water flow. In these aspects, the flow restrictors may be any suitable element for actively controlling flow rate, such as, for example, an electronically controlled valve with an adjustable opening.

Figure 7A:
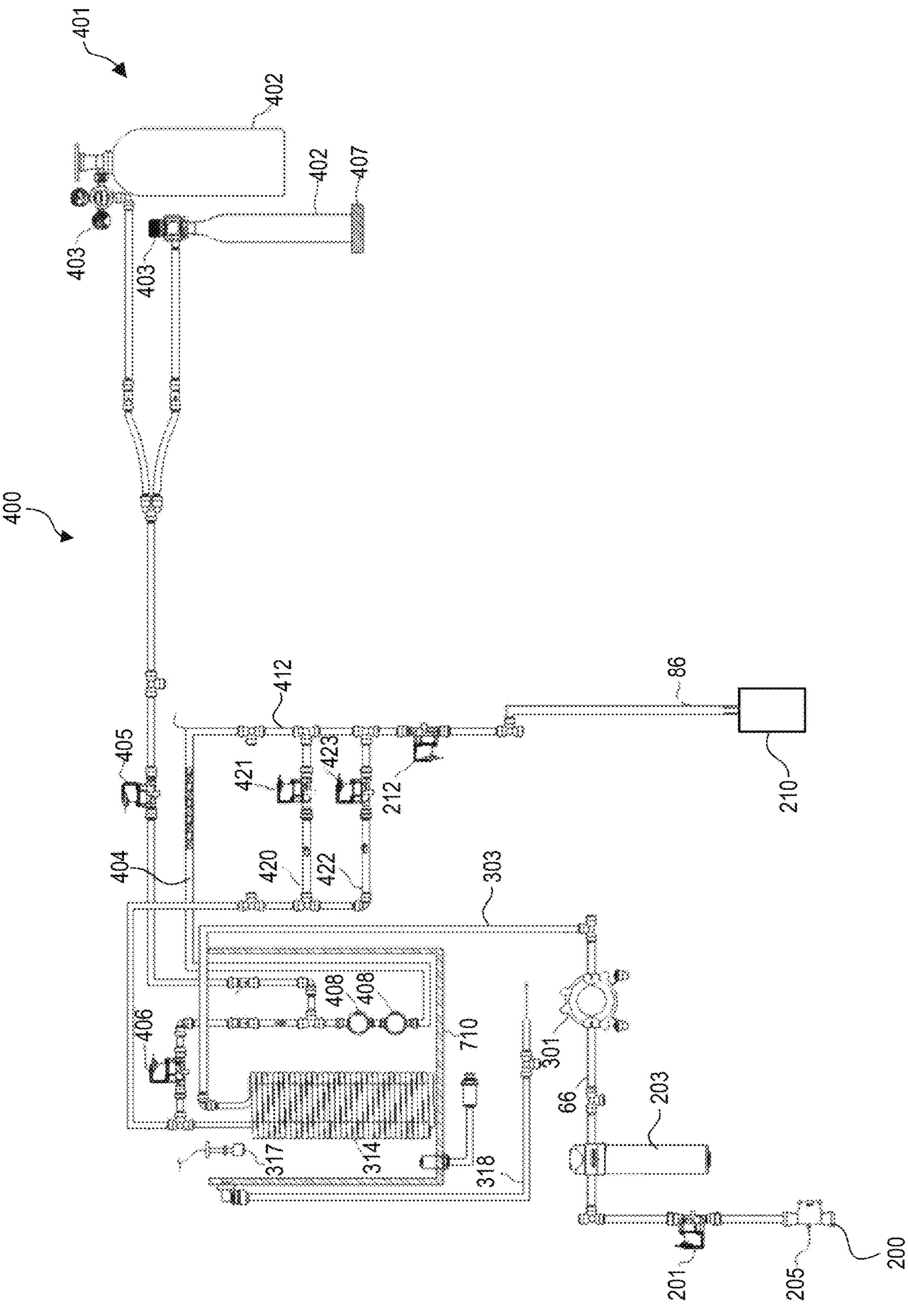
FIGS. 7A-7C are schematic views of a beverage dispenser according to aspects.
Figure 7B:
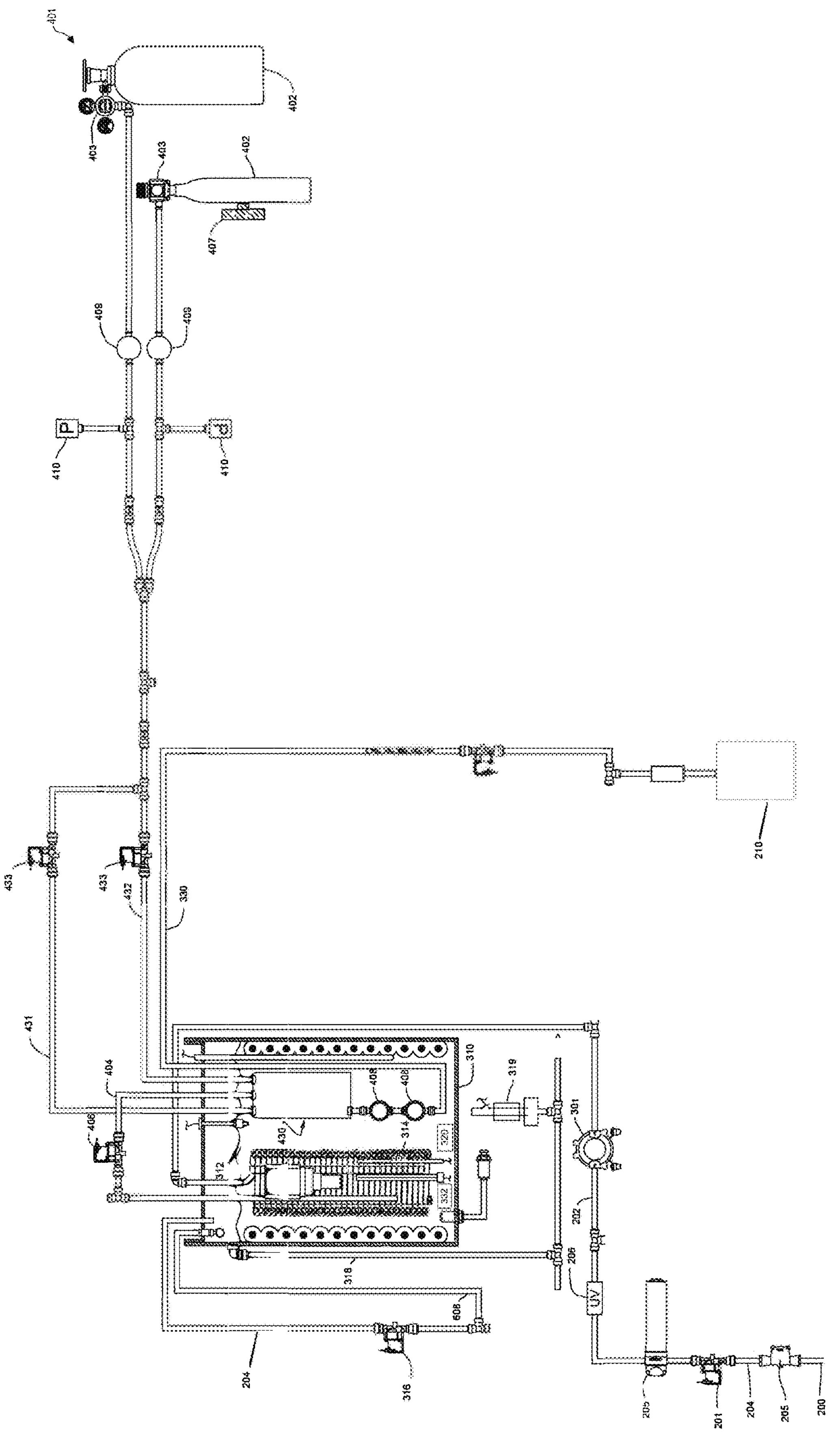
Figure 7C:
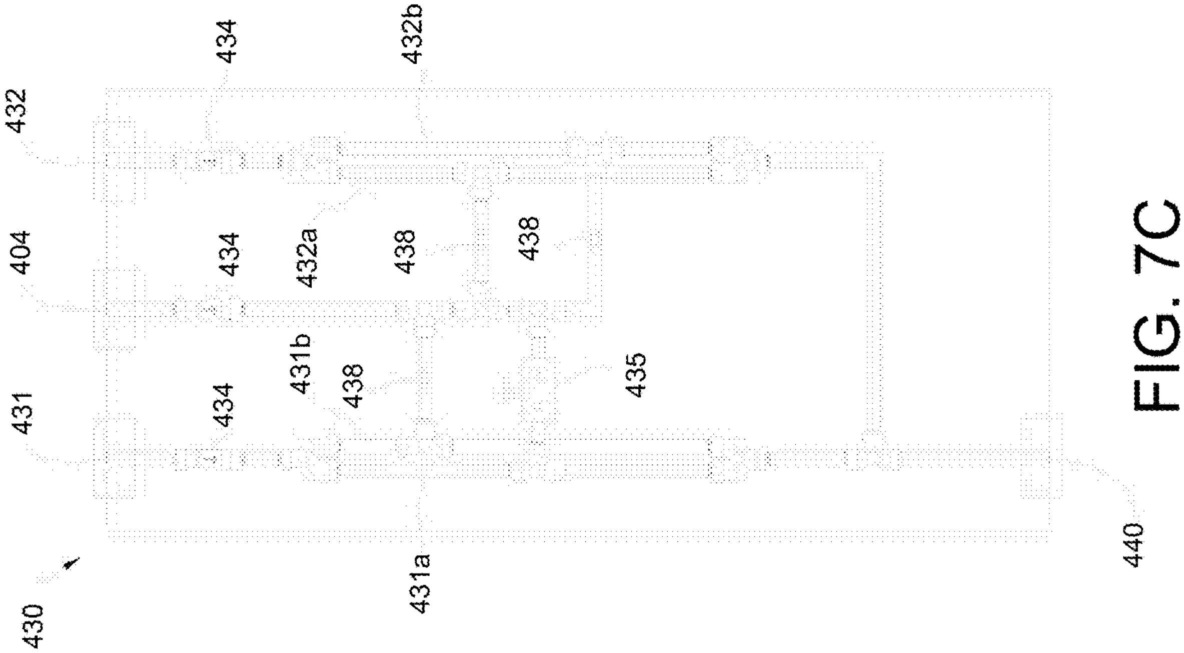

The operation of sparkling functional group 400 of beverage dispenser 1 is discussed with reference to FIGS. 7A-7C. FIG. 7A-7C illustrates sparkling functional group 400 in isolation for clarity only, and should not be interpreted to suggest that an aspect of beverage dispenser 1 only includes the plumbing shown in FIGS. 7A-7C. Sparkling functional group 400 is configured to produce water with varying levels of dissolved gas, which is often called sparkling water. In beverage dispenser 1, any sparkling water that is dispensed is mixed on-demand and is not stored, or supplied to, beverage dispenser 1 in a pre-mixed state.

In the following discussion of sparkling functional group 400, the term "carbonation" or variants thereof may be used when describing the dissolved gas in the sparkling water. These terms are used for convenience only and should not be interpreted to mean that only CO2 gas may be used in sparkling functional group 400. Any suitable gas may be used as the dissolved gas, including, for example, nitrogen gas and CO2 gas mixed with other suitable gasses.

As shown in FIGS. 7A and 7B, for example, a gas source 401 is fluidly connected to a chilled water line 404. Gas source 401 includes at least one source of gas. For example, gas source 401 may include a gas container 402 of carbon dioxide gas ("CO2"). This tank may be of any suitable size and type. In some aspects, container 402 is sized to fit entirely inside housing 100 in a corresponding container receptacle. In these aspects, gas container 402 is removably connected to a gas pressure regulator 403 that has the primary function of reducing and regulating the gas pressure from the CO2 tank and is accessible for replacement through one of access doors 107, 108. The connection to gas pressure regulator 403 provides the gas connection to chilled water line 404 through gas valve 405.

In some aspects, there may be more than one gas container 402 fluidly connected to chilled water line 404. For example, as shown in FIGS. 7A and 7B, there may be two gas containers 402. One or both gas container(s) 402 may be mounted inside housing 100 and accessed through door 108 as discussed above. In some aspects, only one of the multiple containers 402 may be mounted in housing 100, inside the corresponding container receptacle. The other container 402 (or containers 402) may be located outside of housing 100 and fluidly connected to CO2 inlet 135 disposed on the outside of housing 100. CO2 inlet 135 is, in turn, fluidly connected to chilled water line 404. In some aspects, as discussed above with respect to FIG. 4, CO2 inlet 135 is disposed on rear wall 102 of housing 100. However, CO2 inlet 135 may be disposed on any suitable surface of housing 100. In some aspects, CO2 inlet 135 may comprise multiple connecting points to accommodate multiple external gas sources. CO2 inlet 135 may include any suitable, gas-tight connecting method, including, for example, threaded connections, barb connection, quick-connect fitting (e.g., john-guest type) and bayonet-type quick connections. A gas valve 405, as in FIG. 7A, may be disposed between gas source 401 and chilled water line 404 to control the flow of gas to chilled water line 404.

A container level sensor 407 may be disposed in housing 100. Container level sensor 407 is configured to determine the level of gas in container 402. In some aspects, container level sensor 407 may be a weight sensor that measures a weight of container 402 when container 402 is mounted in housing 100. When the weight of container 402 drops to a predetermined value, container level sensor 407 controller 1000 is configured to send an alert to a user that gas container 402 is low and requires replacement.

Chilled water line 404 receives chilled still water from chiller 310. This water is chilled inside chilling coil 314 as discussed above with respect to cooling functional group 300. A carbonation water valve 406 is disposed on chilled water path 303 downstream of chilling coil 314 to control the flow of chilled water through chilled water line 404. When gas valve 405 opens, gas from gas source 401 is combined with chilled water in chilled water line 404. In the aspect shown in FIG. 7A, the chilled water and gas flow directly to at least one carbonator chamber 408. Carbonator chamber 408 combines the gas and chilled water to create the desired sparkling water through an electrostatic charging of the molecules of the water and of the CO2. As shown in FIGS. 7A and 7B, for example, there may be two electrostatic charging carbonator chambers 408 installed in series in chilled water line 404. In some aspects, having multiple carbonator chambers 408 ensures that the gas from gas source 401 is thoroughly combined with the chilled water from the chilling coil 314 and chilled water line 404.

After passing through carbonator chamber(s) 408, the sparkling water flows through after drip valve 212 to nozzle 210 along a carbonated water path 412. Carbonated water path 412 also has connections to one or more chilled water lines that fluidly connected carbonated water path 412 to chilled water output from chiller 310 and chilling coil 314. For example, as shown in FIG. 7A, carbonated water path 412 may be fluid connected to chilled water lines 420, and 422. Each chilled water line has a corresponding valve 421, and 423 that controls the flow of chilled water through the corresponding chilled water line. Furthermore, each chilled water line 420, and 422 is configured to allow a certain flow rate of chilled water through the line when the corresponding valve is opened. This may be accomplished by including a flow restricting element in the chilled water lines 420 and 422 (either separately or as part of the corresponding valve 421 and 423), or by configuring the piping diameter of the chilled water line as needed.

When one or both of valves 421 and 423 are opened, chilled water flows through the corresponding line and mixes with the sparkling water flowing through carbonated water path 412. This mixing reduces the concentration of the dissolved gas in the sparkling water because plain chilled water (i.e., water without any gas) is being added to the sparkling water in carbonated water path 412. Operation of the valves (e.g., valves 421 and 423) is controlled by controller 1000. Selective operation of combinations of these valves can create different levels of carbonation in the resulting sparkling water that is dispensed at nozzle 210. For example, in aspects of beverage dispenser 1 with three chilled water lines 420 and 422 as shown in FIG. 7A, there are four possible carbonation levels that can be achieved. The highest level of carbonation occurs when all of the chilled water lines remain closed, and only the sparkling water from the carbonator chambers 408 flow the carbonated water path 412. Opening a single valve (i.e., valve 421) results in the second highest level of carbonation in the sparkling water. Opening valve 423 results in a lower level of carbonation while simultaneously opening two of the valves (i.e. valve 421 and 423) results in a much lower level of carbonation. The exact level of carbonation can be selected by modifying two variables: the initial carbonation level of the sparkling water and the flow rate of chilled water through lines 404, 420, 422. The initial carbonation level can be altered by controlling the initial gas flow rate from gas source 401, through CO2 gas regulator 403, and the initial chilled water flow rate though chilled water line 404. The flow rates through chilled water lines 420 and 422 can be controlled through the previously described flow restrictors. An advantage of the plumbing shown in FIG. 7A is that the resulting flow rate of different carbonated waters at the nozzle 210 is approximately the same for every level of resulting carbonation. In fact, while adding chilled water to sparkling water, the water flowing through valve 406 and line 404 is contemporarily reduced when either or both valves 421 and/or 423 contemporarily open.

In some aspects, the flow rates through chilled water lines 420 and 422 may be different from each other caused by different types of restrictors used. In some aspects, (e.g., ref. to FIG. 7A), there are three levels of carbonation: with the highest carbonation level when valves 405 and 406 are open, the middle carbonation level when valve 405, 406 and 421 are open and the lowest carbonation level when valve 405, 406 and 423 are open, due to different flow restrictors in line 420 and 422, respectively. In each of the three cases above, main water valve 201 and after drip water valve 212 must also be open in order to dispense sparkling water at nozzle 210. In some aspects, (e.g., ref. to FIG. 5A), there could be a total of eight different carbonation levels possible because of the permutations possible with three different flow rates from three different chilled water lines 302, 420, and 422. This system of creating different levels of carbonated water is expandable to any number of chilled water lines depending on how many levels of different carbonation are desired. Since the flow rate of the chilled water in line 303 is not varied, the resulting flow rate at the nozzle 210 is substantially the same regardless of the solution chosen.

The aspect of sparkling functional group 400 shown in FIGS. 7B and 7C differs from the aspect of FIG. 7A in how the variable carbonation levels are achieved. As seen in FIG. 7B, a carbonation system 430 is disposed in chiller 310. Carbonation system 430 is shown in detail in FIG. 7C. Note that for clarity carbonation system 430 is depicted as a box in FIG. 7B with the structural details shown in the expanded view of FIG. 7C. There is no physical structure or housing encasing carbonation system 430 inside chiller 310.

As shown in FIGS. 7B and 7C, there are three input lines into carbonation system 430: chilled water line 404 and two separate gas lines 431 and 432 that are fluidly connected to gas source 401, each with a dedicated gas pressurization valve 433 that controls the flow of gas through gas lines 431 and 432. The flow of chilled water through chilled water line 404 is controlled by carbonation water valve 406 as described above.

As shown in FIG. 7C, gas lines 431 and 432 and chilled water line 404 each have check valves 434 that prevent reverse or upstream flow of any fluid or gas through these lines. Gas line 431 is split into two lines 431*a* and 431*b* downstream of check valve 434. Line 431*a* supplies gas to an automatic flow regulator 435. Automatic flow regulator 435 is a controllable flow regulator that can adjust the flow rate of fluid flowing through it. In some aspects, automatic flow regulator is controlled by controller 1000. Line 431*b* is fluidly connected to chilled water liner 404. Lines 431*a* and 431*b* rejoin to form single line 431 downstream of these connections. Similarly, line 432 splits into two lines 432*a* and 432*b* downstream of check valve 434. Both lines 432*a* and 432*b* are fluidly connected to chilled water line 404. Lines 432*a* and 432*b* rejoin to form single line 432 downstream of these connections. Lines 431 and 432 join together to form a sparkling line 440 which exits carbonation system 430. As shown in FIG. 7B, sparkling line 440 is fluidly connected to at least one carbonation chamber 408, which blends the gas and fluid in sparkling line 440 to form sparkling water as discussed above.

The various fluid connections between line 404, 431 and 432 in carbonation system 430 enable production of sparkling water with variable carbonation concentrations. As will be explained below, carbonation system 430 is able to produce more levels of carbonation than the aspect discussed in FIG. 7A. The operation of carbonation system 430 begins when valve 406 is opened to allow chilled water to run through chilled water line 404. Check valves 434 limit the flow of chilled water such that all of the chilled water ultimately exits through sparkling line 440. If maximum carbonation is desired, both gas pressurization valves 433 are opened, allowing gas to flow from gas source 401 to lines 431 and 432. Further, automatic flow regulator 435 is adjusted to block all flow through itself, which prevents chilled water from entering line 431*a*. In this configuration, chilled water flows through chilled water line 404 and into each of lines 431*b*, 432*a*, and 432*b*, where it mixes with gas. The combined chilled water and gas then exits through sparkling line 440, where it flows into carbonator chambers 408 as shown in FIG. 7B for final blending. The maximum carbonation level available can be tuned by adjusting flow restrictors 438 that are placed in each of the lines that connect chilled water line 404 and lines 431*b*, 432*a*, and 432*b*. Flow restrictors 438 may be integrated into the structure of the line itself (i.e., the line internal diameter may be selected to control flow rate). Or, flow restrictors 438 may be separate restricting elements inserted into the corresponding lines that can be adjusted to control flow rate, for example by manually opening or closing an adjustable valve. A higher flow rate setting (i.e., allowing more chilled water to flow) corresponds to less carbonation in the sparkling water. The opposite is true for a lower flow rate setting.

If a level of carbonation that is lower than the maximum carbonation level is desired, automatic flow regulator 435 can be actuated to increase the flow of chilled water to line 431*a*. As the water flow rate through automatic flow regulator 435 increases and water flows into line 431*a*, the carbonation level decreases because more chilled water is being used to absorb a set amount of gas. Any desired carbonation value that corresponds to an achievable flow rate through automatic flow regulator 435 is possible by adjusting automatic flow regulator 435 to the desired flow rate. In this way, a range of sparkling water carbonation levels below the maximum carbonation level is possible.

When a still lower level of carbonation is desired, the flow of gas to lines 431 or 432 can be shut off by closing the corresponding pressurization valve 434. If the flow of gas to line 431 is shut off, the only gas that is blended with chilled water flows through line 432 (and lines 432*a* and 432*b*). This results in a fixed, lower carbonation level for the resulting sparkling water. The precise amount of carbonation can be selected by adjusting flow restrictors 438 as discussed above. In some aspects, this configuration of carbonation system 430 may deliver an intermediate level of carbonation that is lower than the minimum level of carbonation possible when gas is flowing through both lines 431 and 432.

Alternatively, gas may be allowed to flow only through line 431 by shutting off valve 433 in line 432. In this configuration, automatic flow regulator 435 can be used to vary the resulting carbonation level in the manner discussed above. This allows for a second range of variable carbonation level that is lower than the variable carbonation range that is achievable when both lines 431 and 432 are connected to gas source 401. In some aspects, this configuration is set by adjusting flow restrictors 438 to produce the lowest carbonation levels (i.e., a range of carbonation that is lower than both the maximum carbonation range and the intermediate carbonation discussed above). This allows a wide range of carbonation levels to be produced by carbonation system 430.

The aspects of carbonation system 430 shown in FIG. 7C includes a single automatic flow regulator 435. However, other aspects may have two, three, or four automatic flow regulators 435, each of which regulates the flow between chilled water line 404 and one of lines 431*a*, 431*b*, 432*a*, and 432*b*. These aspects result in a wider range of possible carbonation levels for the sparkling water produced by beverage dispenser 1.

Figure 8:
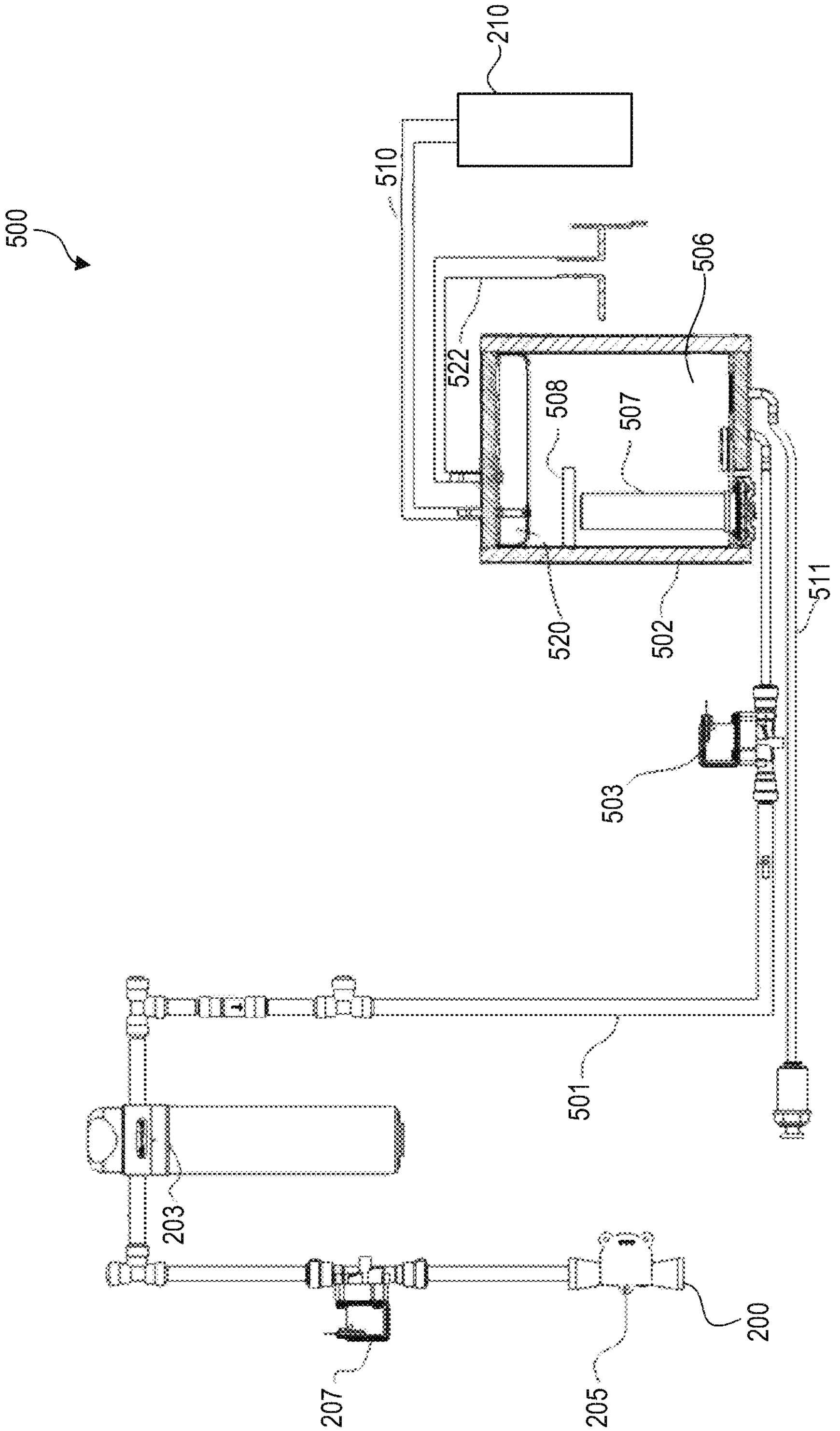
FIG. 8 is a schematic view of a beverage dispenser according to an aspect.

The operation of heating functional group 500 will be explained with reference to FIGS. 5A, 5B, and 8. FIG. 8 illustrates heating functional group 500 in isolation for clarity only, and should not be interpreted to suggest that an aspect of beverage dispenser 1 only includes the plumbing shown in FIG. 8. Heating functional group 500 generates water with a temperature above that of the ambient temperature of the water received at beverage dispenser 1 through water supply 200. As best seen in FIG. 8, heating functional group 500 includes a water heater 502 that is fluidly connected to water filter 203 through water heater supply line 501. A water heater supply valve 503 regulates the flow of water from water supply 200 (via water filter 203) as discussed below.

Water heater 502 is a tank-type water heater that includes a water heater tank 506 with a heater element 507 inside water heater tank 506. Water heater tank 506 may be surrounded by suitable insulation to reduce heat loss from water heater tank 506. Water heater tank 506 is filled with ambient temperature water from water heater supply line 501. Heater element 507 uses electrical power to heat the water present in water heater tank 506. In some aspects, heater element 507 may be a resistive-type heater element.

A water heater temperature sensor 508 is also located in water heater tank 506. Water heater temperatures sensor 508 measures the temperature of water in water heater tank 506 and transmits that measurement to controller 1000. Controller 1000 in turn controls the electrical power flowing to heater element 507 and can therefore raise the water temperature in water heater tank 506 (i.e., by allowing electrical power to flow to heater element 507 that disperses in the environment by joule effect), or lower the water temperature in water heater tank 506 (i.e., by stopping electrical power flow to heater element 507 and allowing the water to cool). Controller 1000 may be programmed to maintain any desired water temperature in water heater tank 506, as discussed in detail below.

Water can be drained from water heater tank 506 through a water heater drain 511 and then through hot water drain 137 in FIG. 4, for example when dispenser 1 has to be relocated or re-packaged.

Water heater 502 is fluidly connected to nozzle 210 through hot water line 510. As shown in the aspect of FIG. 8, hot water line 510 is fluidly connected to the top of water heater tank 506. In order to dispense hot water at nozzle 210, controller 1000 actuates water heater supply valve 503, which begins filling water heater tank 506 with water from water supply 200 at ambient temperature. The pressure of water being added to water heater tank 506 pushes the existing hot water in water heater tank 506 through hot water line 510 and out of nozzle 210.

Water heater 502 also includes a vapor chamber 520 disposed above water heater tank 506. Vapor chamber 520 is vented to the ambient atmosphere by a vapor vent line 522. Water vapor created by heating water in water heater tank 506 flows into vapor chamber 520 and exits water heater 502 via vapor vent line 522. When the user dispenses hot water from beverage dispenser 1, at the moment the user finishes dispensing the hot water, the remaining hot water in hot water line 510 flows back into water heater 502. When hot water dispensing stops, valve 503 closes and hot water remaining in line 510 flows into vapor chamber 520. This way the water remaining in line 510 would never cool down because it will be sucked back into the water heater 502. This ensures that the water being dispensed from water heater 502 is closer to the water temperature being maintained in water heater tank 506 because no partially or completely cooled water from hot water line 510 is dispensed out of nozzle 210.

In some aspects, water heater 502 may be set to maintain the water temperature in water heater tank 506 at an intermediate hot water temperature. In some aspects, this intermediate temperature may be between 180 and 190 degrees Fahrenheit. When boiling hot water is required (i.e., water with a temperature near 212 degrees Fahrenheit), heater element 507 can be used to heat the water to the required temperature on demand. This results in a short delay before dispensing the boiling water from nozzle 210 as the water in water heater 502 heats up, but requires significantly less power than maintaining hot water at or near boiling temperature constantly and water loss due to steam would also be less pronounced.

Figure 9:
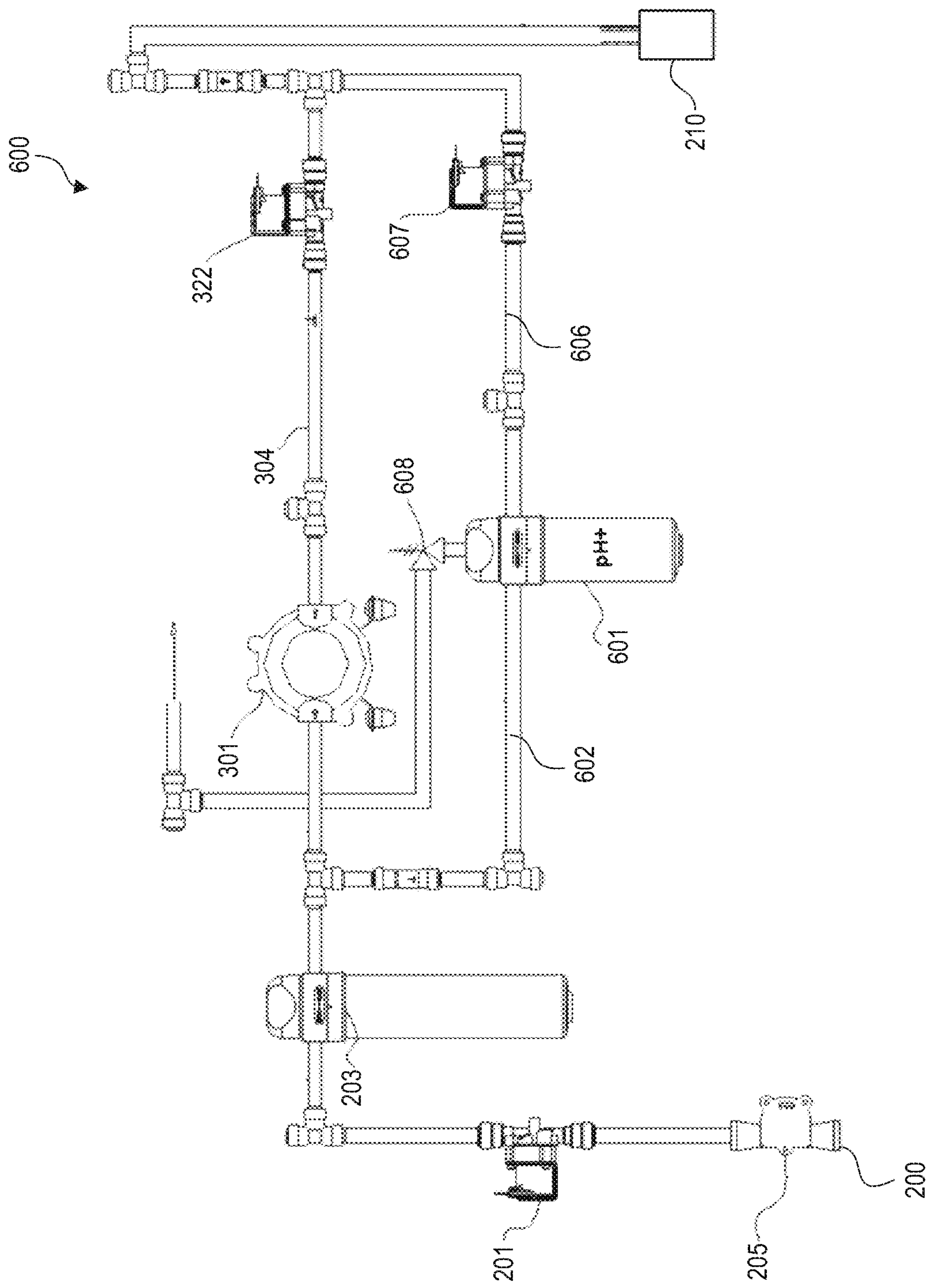
FIG. 9 is a schematic view of a beverage dispenser according to an aspect.

The operation of alkaline functional group 600 will be discussed with reference to FIGS. 5A, 5B, and 9. FIG. 9 illustrates alkaline functional group 600 in isolation for clarity only, and should not be interpreted to suggest that an aspect of beverage dispenser 1 only includes the plumbing shown in FIG. 9. Alkaline functional group 600 is configured to decrease the acidity of dispensed water (i.e., increase the pH level of the water above 7). In some aspects, the increase of alkaline level of the water results from dissolving an alkaline material in the water, adding electrolytes. In other aspects, electrolytes may be generated by electrolysis or both. As seen in FIG. 9, an alkaline chamber 601 is fluidly connected to water filter 203 by an alkaline supply line 602. While alkaline chamber 601 is shown separate from water filter 203 in FIG. 9, in some aspects alkaline chamber 601 and water filter 203 can be physically located in the same cartridge housing. This can improve accessibility to these elements for maintenance. In some aspects, alkaline chamber 601 may contain alkaline materials that dissolve into water that flows through alkaline chamber 601, thus raising the pH (i.e., lowering the acidity) of the water downstream. Alkaline chamber 601 is fluidly connected to nozzle 210 through an alkaline water line 606. Alkaline water valve 607 is disposed on alkaline water line 606 to control the flow of alkaline water to nozzle 210. As shown in FIG. 5B, an electrical conductivity sensor 605 can be connected to alkaline water line 606 to measure the electrical conductivity of the alkaline water. This measurement can be used by controller 1000 to verify the pH level of the alkaline water. In some aspects, alkaline chamber 601 also includes a gas vent 608 to vent gas produced by the alkaline material as it dissolves in the water in alkaline chamber 601. As shown in FIG. 5B, in some aspects gas vent 608 is connected to chiller 310 to vent the gas. In some aspects, the pH level of the alkaline water produced by alkaline chamber 601 is between 7.0 and 10.0, and more preferably between 8.0 and 9.5 pH.

In some aspects, beverage dispenser 1 may be configured to offer two different levels of alkaline water. Alkaline water with a higher pH level is dispensed when only water flowing through alkaline chamber 601 is allowed to exit nozzle 210, by opening valve 607. Water with an intermediate pH level, between the high pH level of the water exiting alkaline chamber 601 and the pH level of the water from water supply 200, can be dispensed by allowing water to flow to nozzle 210 from both alkaline chamber 601 and directly from water filter 203, following the ambient water path 304 and through the valve 322—in this case the water pump 301 will not operate, while both valve 607 and 322 open simultaneously. The water from water filter 203 through water path 304 has a lower pH level than the water from alkaline chamber 601, and when mixed together the resulting dispensed water has an intermediate pH level. The exact pH level of this intermediate pH level water can be tailored by adjusting the flow rates of water from alkaline chamber 601 and water filter 203. For example, adjusting the flow rates of the water from water filter 203 to be greater than the flow rate from alkaline chamber 601 results in a lower pH level for the intermediate pH level water. Conversely, adjusting the flow rates of the water from water filter 203 to be less than the flow rate from alkaline chamber 601 results in a higher pH level for the intermediate pH level water. The flow rates may be adjusted by including flow restricting elements, fixed or adjustable, in the appropriate fluid connection lines or valves as needed.

Figure 10A:
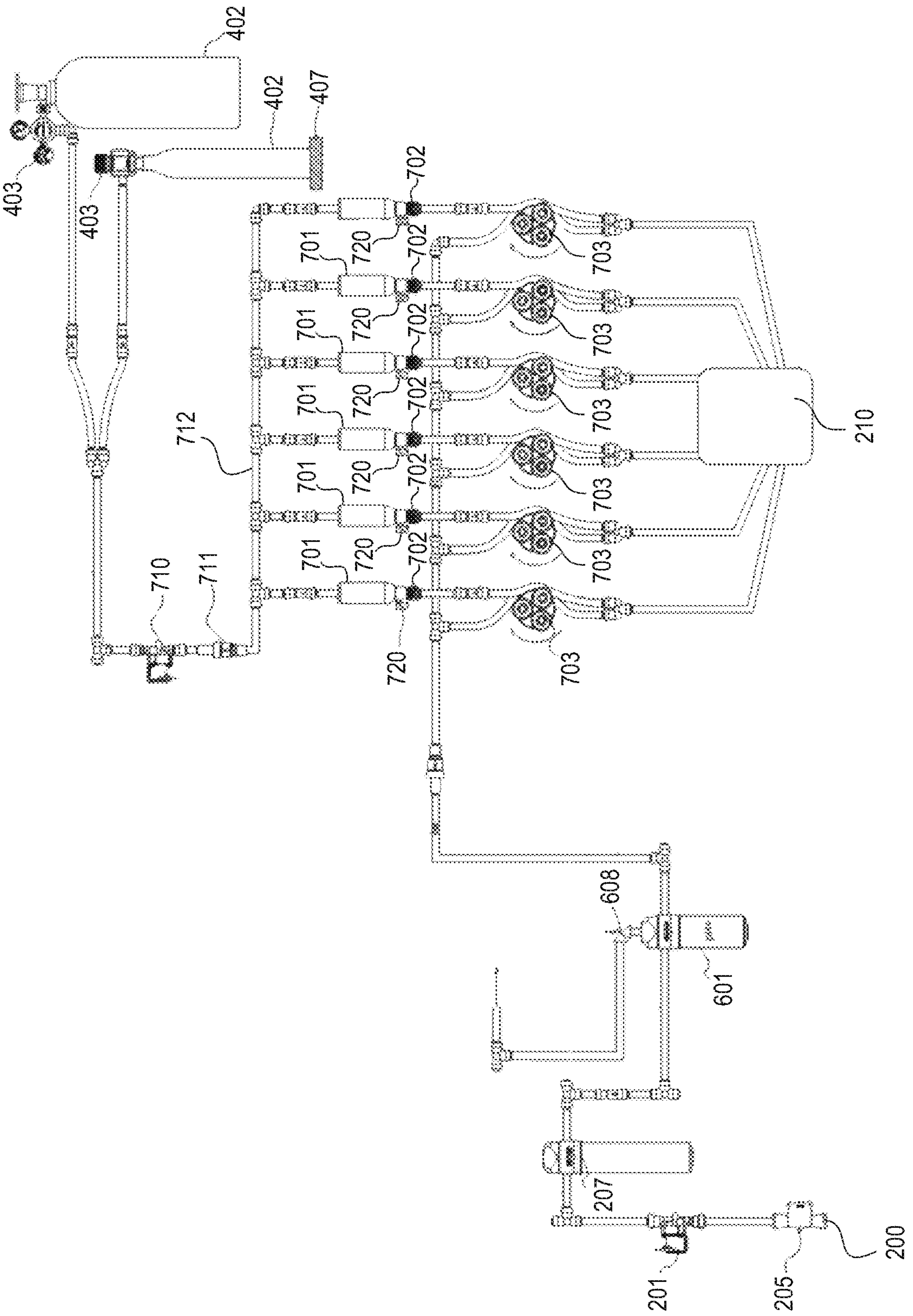
FIGS. 10A and 10B are schematic views of a beverage dispenser according to aspects.

The operation of flavoring and enhancement functional group 700 will be discussed with reference to FIGS. 6, 10A, and 10B. FIG. 10A illustrates flavoring and enhancement functional group 700 in isolation for clarity only, and should not be interpreted to suggest that an aspect of beverage dispenser 1 only includes the plumbing shown in FIG. 10. Flavoring and enhancement functional group 700 enables beverage dispenser 1 to add various combinations of flavorings, enhancements, and other additives in an on-demand fashion to the water being dispensed from nozzle 210. The flavorings or enhancements may be added in any number and in any combination desired by the end user, as will be discussed in detail below.

As best seen in FIG. 10A, beverage dispenser 1 includes at least one concentrate container 701 disposed in housing 100. Concentrate containers 701 store a single flavoring, enhancement, or other additive in a highly concentrated form. The flavoring, enhancement, or other additive may be concentrated at dilution ratios (when mixed with water) from 1:20 to 1:1000 (e.g. from one part of concentrate and twenty-five parts of water, to one part of concentrate and one thousand parts of water). Preferably the ratio is between 1:20 to 1:400, where these ratios are the ratio of the syrup/flavoring/enhancements recommended dilution in water—as specified by the syrup/flavoring/enhancement producer. In some aspects, the concentration ratio in concentrate containers 701 is at least 1:400. An advantage of having a higher concentration ratio is that concentrate containers 701 may store a set amount of concentrate in a smaller volume and produce a large amount of post-mix beverage: for example, a 100 milliliter concentrate container can produce 40 liters of beverage when the dilution ration is 1:400. This is especially important in aspects of beverage dispenser 1 that are compact in size, because less internal volume needs to be dedicated to concentrate containers 701.

Any suitable food-grade syrup, flavoring, enhancement, or other additive or foodstuff may be stored in concentrate containers 701. For example, flavorings may include lemon, lime, cherry, apple, sugar, other fruits, other vegetables, or any combination of flavors. Enhancements may include vitamins, electrolytes, and minerals. Additives may include caffeine, taurine, herbal flavors, sugar, detox, or dietary compounds, and other substances. Concentrate container 701 may also include a complete beverage flavor. For example, concentrate container 701 may include a green tea concentrate, a coffee concentrate or a proprietary soda concentrate.

Including multiple concentrate containers 701 allows beverage dispenser 1 to dispense a wider ranges of beverages because there are more onboard ingredients to mix into different beverages. In some aspects, there are at least two concentrate containers 701 stored in housing 100. In some aspects, there are six concentrate containers 701 stored in housing 100. In some other aspects there are eight, twelve, or sixteen concentrate containers 701 stored in housing 100.

In some aspects, concentrate containers 701 are removably connected to a container cap 702. Container cap 702 supports concentrate containers 701 in housing 100 and also fluidly couples concentrate containers 701 to elements of flavoring and enhancement functional group 700. Container cap 702 may include threads, a bayonet-style connection, or other suitable connection interface elements to couple with corresponding interface elements on concentrate container 701. In some aspects, container cap 702 is glued to container 701 and becomes an integral element of container 701 and cannot be removed by user, thus avoiding that the concentrate inside container 701 be exposed to air.

In some aspects a container level sensor 720 may be associated with each concentrate container 701. Container level sensor 720 is configured to detect the level of concentrate in concentrate container 701 and transmit that level to controller 1000. Container level sensor 720 may be any suitable sensor that can detect concentrate level. For example, in some aspects, container level sensor 720 is a weight sensor that detects the weight of concentrate container 701. When the weight drops to a predetermined value, the concentrate is at or near an empty state. In some aspects, container level sensor 720 may be an optical sensor or a microwave sensor. In these aspects container level sensor 720 directly detects the presence of a concentrate in the bottom portion of concentrate container 701 using the optical sensor or microwave sensor. In some aspects, when concentrate is not detected in the bottom part of the concentrate container, sensor 720 electronically transmit this information to controller 1000.

In some aspects, beverage dispenser 1 may be configured to detect whether concentrate container 701 is disposed in housing 100. For example, container level sensor 720 may be configured to detect the presence of concentrate container 701 in addition to detecting the level of concentrate container 701. Controller 1000 may be configured to take several actions when it receives notification of a missing concentrate container 701. For example, controller 1000 may restrict dispensing of concentrate from the missing concentrate container 701. This can prevent a beverage from being formed without a required ingredient and reduce unnecessary wear on system components, such as pumps and valves. In some aspects, a separate container sensor 722 (see FIG. 3) may be configured to perform the container detection function, and may be disposed in a suitable location in housing 100 to detect the presence of concentrate container 701. For example, container sensor 722 can be a camera that can visually detect the physical presence of concentrate container 701 and transmit that information to controller 1000. Container sensor 722 can also be used to read information (e.g., concentrate type, container volume) contained on a label on an exterior of concentrate container 701 and transmit that information to controller 1000. Controller 1000 may also be configured to transmit or display an alert if concentrate container 701 is missing. Transmitting and displaying alerts is discussed in detail below. In some aspects, other sensors similar to container sensor 722 may be configured to detect the presence of other removable consumable items in housing 100, such as water filter 203, alkaline chamber 601, or gas container 402. In these aspects, controller 1000 may also be configured to prevent beverage dispensing and transmit and display alerts as needed.

As seen in FIGS. 5A, 5B, 10A, and 10B concentrate container 701 is fluidly connected to concentrate pump 703 by container cap 702. In some aspects, (e.g., ref. FIG. 10A), concentrate pump 703 is also fluidly connected to alkaline chamber 601 to receive the highly alkaline water from alkaline chamber 601. Concentrate pump 703 may be any suitable type of pump. In some aspects, concentrate pump 703 is a peristaltic pump that, in some aspects, may be a low-voltage DC peristaltic pump. In aspects of beverage dispenser 1 with more than one concentrate container 701, each concentrate container 701 is fluidly connected to a single, dedicated concentrate pump 703.

In aspects like those of FIGS. 5A and 10A, concentrate pump 703 pumps both the concentrate from concentrate container 701 and the highly alkaline water from alkaline chamber 601 into a single line that is fluidly connected to nozzle 210. The concentrate and the highly alkaline water are blended together in a fixed pre-mix dilution ratio, by this pumping process by the time they arrive at nozzle 210. After arriving at nozzle 210 the concentrate and alkaline water combination is blended with any other fluids (e.g., chilled water, ambient temperature water, sparkling water, alkaline water, hot water) and dispensed from nozzle 210. The amount of concentrate pumped by concentrate pump 703 may be varied by controlling pump power and speed to add more or less concentrate to the beverage to be dispensed depending on the desired concentrate level. Multiple concentrates may be added to the beverage by running multiple concentrate pumps 703, each of them at a different speed (by varying the voltage of the peristaltic pump), during the dispensing of the beverage.

Figure 10B:
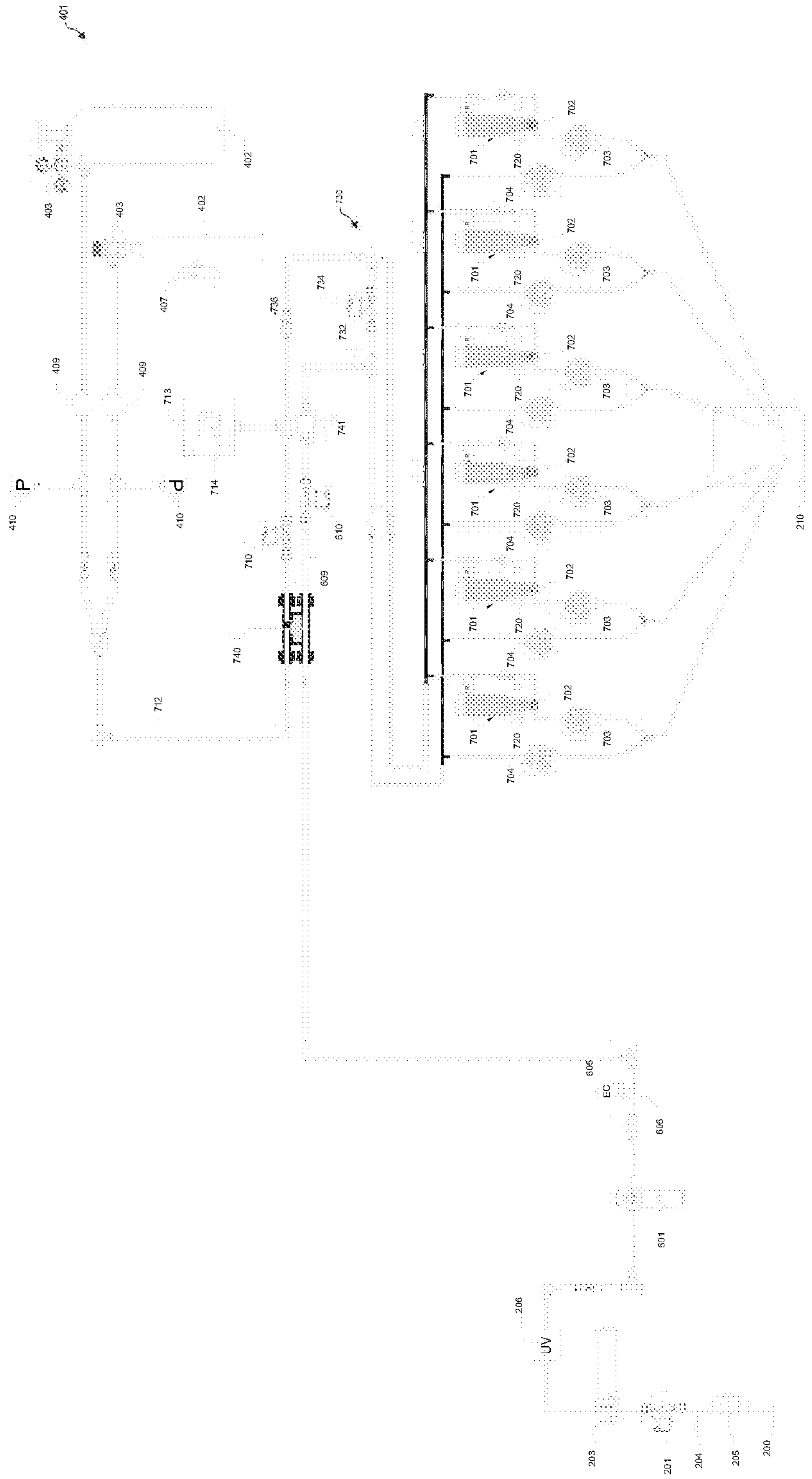

In aspects like those of FIGS. 5B and 10B, concentrate container 701 is also associated with a dedicated alkaline pump 704. Alkaline pump 704 is fluidly connected to receive the highly alkaline water from alkaline chamber 601 through an alkaline line 609 with a corresponding valve 610 for controlling flow of alkaline water through alkaline line 609. The output of alkaline pump 704 joins with the output of concentrate pump 703 (i.e., the concentrate) prior to reaching nozzle 210. Alkaline pump 704 may be any suitable type of pump. Note that in these aspects, concentrate pump 703 and alkaline pump 704 can be configured to only pump their corresponding liquid (i.e., concentrate or alkaline water, respectively). In some aspects, alkaline pump 704 is a peristaltic pump that, in some aspects, may be a low-voltage DC peristaltic pump. In these aspects, both concentrate pump 703 and alkaline pump 704 operate together to pump the concentrate and alkaline water into a single line that is fluidly connected to nozzle 210. The concentrate and alkaline water blend together prior to arriving at nozzle 210 in the same manner as discussed above in the aspects that only include concentrate pump 703. However, as discussed in detail below in the aspects described in FIGS. 5B and 10B, the speeds of the two pumps 703 and 704 determines the pre-mix dilution ration between alkaline water and concentrate, so that this ratio is no longer fixed as in aspects described in FIGS. 5A and 10A. By varying the pre-mixing dilution ratio between alkaline water and concentrate, the optimal pre-dilution can be set exclusively based on the chemical properties of the concentrate in question.

Combining the concentrate with alkaline water before sending the concentrate to nozzle 210 (an alkaline pre-mixing/pre-dispensing solution) provides a significant improvement in the blending of the concentrate in beverages dispensed by beverage dispenser 1 due to issues with mixing high ratio concentrate in water. As discussed above, the concentrate in concentrate containers 701 may be highly concentrated—typically at a ratio 400:1. This is much higher than standard post-mix beverage concentrate of typical soda fountains, which is usually mixed at a ratio of around 5:1, 7:1, or 8.5:1. Testing showed that the high ratio concentrates did not easily and uniformly mix into water, specifically cold water or sparkling water. But, because of volume constraints, higher concentrate ratios are generally preferred to minimize the total volume of concentrate containers 701.

Testing also showed that highly alkaline water, with an elevated pH, dissolved the high ratio concentrate relatively easily, particularly when high-viscosity values (at ambient temperatures) and oil-based concentrates were used. Thus, beverage dispenser 1 is configured to pre-blend the high ratio concentrate with a relatively small amount of alkaline water to create a micro-dosing system. For example, the concentrate and highly alkaline water may be blended at ratios between 1:0 to 1:20, with 1:7 being an optimal ratio for alkaline pre-mixing/pre-dispensing (i.e. one part of concentrate and 7 parts of alkaline water). The aspects with concentrate pump 703 and alkaline pump 704 enable the ability to modify this ratio during dispensing operations by controlling the operation of concentrate pump 703 and alkaline pump 704. For example, alkaline pump 704 may be operated at a faster or slower rate while to increase or decrease the ratio of alkaline water that is blended with the concentrate. This allows for beverage dispenser 1 to tailor the pre-blending operation to different types of concentrate. For example, in some aspects, the ratio of concentrate to alkaline water may be actively controlled from a range of 1:0 to 1:12. This alkaline pre-mixing/pre-dispensing system thoroughly dissolves the concentrate into the alkaline water and the resulting fluid can be more easily blended with other fluids (e.g., cold, hot, ambient, alkaline, or sparkling water) in the nozzle. This process is particularly important for oil-based concentrate that, as discussed above, is harder to dilute. Due to the alkaline pre-mixing/pre-dispensing aspect, the resulting beverage dispensed from the nozzle will be thoroughly and completely blended and will not include concentrate that is not dissolved due to poor mixing with water in the nozzle. Another advantage of this aspect of alkaline pre-mixing/pre-dispensing is prevention of foaming when the fluid is mixed with sparkling water in the nozzle and a sparkling beverage is dispensed. Excessive foaming is a phenomenon that can prevent a correct filling of a beverage container (e.g. a glass, a bottle, a travel mug) because the foamy beverage overflows the container. Excessive foaming also reduces the level of carbon dioxide dissolved in the beverage. In aspects that only include a concentrate pump 703, the specific concentrate ratio in the combination of alkaline water and high ratio that arrives at nozzle 210 may be adjusted by selecting the flow rates of the alkaline water and high ratio concentrate flowing into concentrate pump 703. The flow rate of the alkaline water from alkaline chamber 601 may be controlled by inserting a suitable flow restriction element (fixed or adjustable) into the fluid line connecting alkaline chamber 601 to concentrate pump 703. The flow rate of high ratio concentrate may be controlled in a similar manner. In some aspects, the concentration ratio of the fluid arriving at nozzle 210 from concentrate pump 703 may be between 1:2 and 1:20.

This system of pre-diluting the concentrate from concentrate container 701 has the advantage of enabling the use of high ratio concentrate, and thus reducing system volume and weight, while still producing a suitably blended beverage that does not require further mixing by the end user. In some aspects of beverage dispenser 1, there are no additional mixing chambers or components between concentrate container 701 and nozzle 210. Specifically, there are no mixing chambers or similar components designed to mix the beverage together by, for example, manually mixing the beverage (e.g., with a motor driven blade, paddle or, spoon) or by fluidly combining the beverage (e.g., by routing the beverage through chambers, passages, or other elements designed to create a turbulent fluid flow).

In some aspects, container cap 702 is also fluidly connected to gas source 401 to allow gas to pass from gas source 401 to container cap 702. Container cap 702 allows gas from gas source 401 to enter concentrate container 701 as it is emptied. This provides at least three advantages. First, the pressurization of concentrate container 701 improves the flow of concentrate to concentrate pump 703 by forcing the concentrate to flow to concentrate pump 703. This is especially relevant with high ratio concentrates, which often have increased viscosity and do not flow well under gravity alone. Second, the pressurization of concentrate container 701 can help maintain the freshness of the concentrate in concentrate container 701 because the gas used in gas source 401 is typically a gas that reduces spoilage due to oxygen exposure (e.g., CO2, or nitrogen gas). Thus, as the concentrate is emptied from concentrate container 701, it is replaced with a gas that reduces spoilage instead of plain air. Third, when gas source 401 does not contain ambient air foaming of the resulting beverage is reduced because there is less air to cause foaming in the resulting beverage.

Figure 10C:
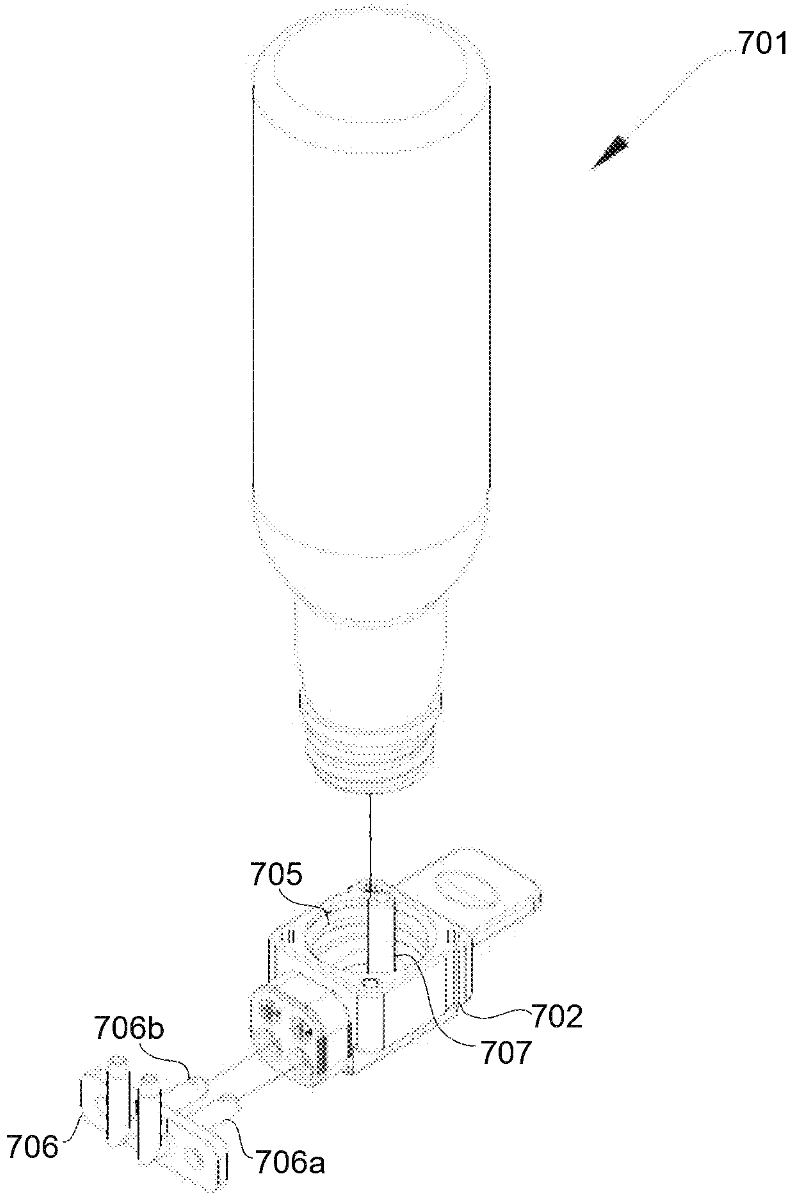
FIG. 10C is a perspective view of a concentrate container cap according to an aspect.

An aspect of container cap 702 is shown in FIG. 10C. An opening 705 in a top surface of container cap 702 is configured to receive concentrate container 701. As seen in FIG. 10C, concentrate container 701 has threads that match corresponding threads in opening 705 such that container 701 can be threaded into container cap 702. As discussed above, these threads can also be any other suitable retaining mechanism such as a bayonet connection or a friction-based retaining connection. Suitable sealing elements can be integrated into one or both of concentrate container 701 and container cap 702 to create a fluid-tight seal. Also shown in FIG. 10*c* is insert 706 that can be inserted into a side of container cap 702. Insert 706 includes a gas connection 706*a* and a fluid connection 706*b*. Fluid connection 706*b* is fluidly connected to opening 705 to allow concentrate to be pumped out of concentrate container 701. Gas connection 706*a* is connected to a gas tube 707 disposed in opening 705 to supply pressurized gas into concentrate container 701 as described above. In some aspects, insert 706 is removably fastened to container cap 702 by suitable fasteners such as screws. In other aspects, insert 706 is permanently fastened to container cap 702 through a suitable method such as adhesives or welding. In other aspects, insert 706 is an integrated portion of container cap 702 such that container cap 702 and insert 706 are formed as one element. Container cap 702 can contain check valves in gas connection 706*a* and fluid connection 706*b* to prevent undesired fluid flow. For example, a check valve in gas connection 706*a* may only allow gas to flow into container cap 702 through gas tube 707 from an exterior of container cap 702. A check valve in fluid connection 706*b* may be oriented in the opposite direction and only allow concentrate to flow from opening 705 out through fluid connection 706*b*.

As shown in FIG. 10A, gas flows from gas source 401 through a container pressurization valve 710 and a container pressurization regulator 711 to container cap 702 via pressurization line 712. Container pressurization valve 710 is controlled by controller 1000 and can be shut off when, for example, concentrate container 701 is being replaced to prevent loss of gas. Container pressurization regulator 711 reduces the pressure of the gas from gas source 401 to a pressure suitable for pressurizing concentrate container 701. For example, container pressurization regulator 711 may reduce gas pressure to approximately 10 PSI.

As shown in FIG. 10B, a flow meter 409 can be disposed in the gas lines connected to gas containers 402. Flow meter 409 provides gas flow data to controller 1000, which can be used to determine if gas is flowing at the desired rate from gas source 401. Additionally, pressure sensors 410 can also be fluidly connected to the gas lines connected to gas containers 402. Pressure sensors 410 are also connected to controller 1000 and can be used by controller 1000 to ensure that the gas regulators 403 are functioning properly and also to determine if there are supply issues from gas containers 402 (e.g., if one of gas containers 402 is almost empty and needs to be replaced). In aspects flow meter 409 and pressure sensor 410 may be components of gas pressure regulator 403 and are an integral part of gas pressure regulator 403.

Also shown in FIG. 10B is a flow regulator 740. Flow regulator 740 receives gas from gas source 401 and alkaline water from alkaline chamber 601. The gas output of flow regulator 740 is connected to pressurization line 712 through container pressurization valve 710 and then into container caps 702 as discussed above. The alkaline water output of flow regulator 740 (i.e., alkaline line 609) is connected to alkaline pumps 704. Flow regulator 740 regulates the flow of gas from gas source 401 based on the pressure of alkaline water from alkaline chamber 601 that is detected through a pressure sensor 741. When the pressure of the alkaline water falls below a preset pressure, flow regulator 740 restricts or shuts off the flow of gas to pressurization line 712. This ensures that the proper proportion of gas and alkaline water is being supplied to flavor and enhancement group 700, which improves system performance and operation. In some aspects, flow regulator 740 is a mechanical system that is set to activate at a fixed pressure of alkaline water. In these aspects, a drop in pressure in the supplied alkaline water cause mechanical movement that restricts or shuts off gas flow from gas source 401. In other aspects, flow regulator 740 is an electromechanical device that can include solenoid valves or electromechanical flow restrictors and pressure sensors. Controller 1000 can read the pressure of the alkaline water and restrict or shut off the flow of gas to pressurization line 712 as needed.

Also shown in FIG. 10B is an expansion tank 713 that is fluidly connected to pressurization line downstream of flow regulator 740 and upstream of container caps 702. Expansion tank 713 can be an inflatable plastic bag that expands and contracts with gas from gas source 401 and functions to provide a steady flow of gas to container caps 702. In some aspects, a tank sensor 714 is connected to expansion tank 713 and can detect if expansion tank 713 is sufficiently filled with gas. Controller 1000 receives the status of expansion tank 713 from tank sensor 714 and can then limit dispensing operations if insufficient gas is present. In some aspects, tank sensor 714 is a limit switch that is configured to determine the physical inflation of a rubber bladder in expansion tank 713.

FIG. 10B shows an aspect of flavoring and enhancement functional group 700 that includes a cleaning system 730 that cleans the various lines that fluidly connect the output of container cap 702 to nozzle 210. This cleaning process is intended to operate when a concentrate container 701 is empty and ready for replacement. Cleaning system 730 includes an additional cleaning line 732 that connects the output of alkaline chamber 601 with pressurization line 712. As shown in FIG. 10B, cleaning line 732 is disposed upstream of the point where pressurization line 712 splits into multiple lines to connect to caps 702. A cleaning valve 734 is disposed in cleaning line 732 and is controlled by controller 1000, which can open or close cleaning valve 734. During normal operation of beverage dispenser 1, cleaning valve 734 is closed and flavoring and enhancement functional group 700 functions as discussed above. When cleaning is desired, controller 1000 opens valve 734, which fluidly connects pressurization line 712 and the output of alkaline chamber 601. This allows alkaline water to flow into pressurization line 712 through cleaning line 732. A check valve 736 is disposed in pressurization line 712 upstream of the intersection of cleaning line 732 and pressurization line 712 to prevent alkaline water from flowing further upstream in pressurization line 712 and undesirably enter gas expansion tank 713. The alkaline water therefore flows downstream in pressurization line 712 and passes through caps 702, the empty concentrate container 701, concentrate pumps 703, and the lines that connect these elements to nozzle 210, where the alkaline water exists beverage dispenser 1. The alkaline water flushes any leftover concentrate from the fluid lines and these elements, ensuring that there is no concentrate left in the lines when a new concentrate cartridge 701 is installed.

After the lines have been flushed, cleaning valve 734 is closed, which removes the fluid connection between alkaline chamber 601 and pressurization line 712. A small amount of gas from gas source 401 is allowed to flow through pressurization line 712 to purge any remaining alkaline water out of nozzle 210. This further ensures that any residual concentrate is flushed out of nozzle 210 and also returns flavoring and enhancement functional group 700 to operational status. In aspects of flavoring and enhancement functional group 700 that have multiple concentrate containers 701, cleaning system 730 can be operated to clean only a selected subset of concentrate containers 701. For example, if only a single concentrate container 701 is empty and must be replaced by a new one, before it is replaced, cleaning system 730 can be operated to clean only the lines and components associated with that concentrate container 701 that is empty. This is accomplished by operating only the concentrate pump 703 that is associated with the empty concentrate container 701 while leaving the other concentrate pumps 703 idle. In this situation, concentrate pump 703 should be the type of pump that does not allow fluid to pass unless it is operating (e.g., a peristaltic pump). By selectively operating concentrate pumps 703 while activating cleaning system 730, controller 1000 can ensure that only the appropriate concentrate containers 701 and their associated components are cleaned.

Using cleaning system 730 to clean flavoring and enhancement functional group 700 prior to switching concentrate containers 701 has the benefit of reducing flavor contamination when changing concentrate containers 701. This is particularly important when the new concentrate container 701 includes a different flavor concentrate or is a different type of concentrate (e.g., when an enhancement concentrate like caffeine is substituted for a flavoring concentrate). Operation of cleaning system 730 may be initiated by controller 1000 after receiving an input from a user prior to switching concentrate containers 701. In some aspects, controller 1000 may also be programmed to operate cleaning system 730 automatically in certain situations. For example, controller 1000 may operate cleaning system 730 if beverage dispenser 1 has been idle for a predetermined time period. Controller 100 may also automatically operate cleaning system 730 when it detects an empty state of concentrate container 701.

The above described systems have at least several advantages. First, as discussed above, the use of high-ratio concentrate enables the use of smaller concentrate containers 701, which reduces the overall size and weight of beverage dispenser 1 without sacrificing beverage production capability. Second, the system of pre-mixing the concentrate with alkaline water and then blending the concentrate at the nozzle produces a fully mixed beverage that does not need to be mixed in a separate mixing chamber, which further reduces the size and weight of beverage dispenser 1. Third, the dispensed beverage is fully blended and may be immediately consumed by the end user without further blending or mixing in beverage container 2.

Furthermore, the method of selecting flow rates to create the different blended fluids (e.g., intermediate temperature still water or lightly carbonated sparkling water) creates several advantages. First, this type of system does not require separate blending chambers and thus reduces overall system size and weight. Second, this type of system does not require valves or other flow restricting elements that are capable of varying flow rate. Such valves are more expensive than standard solenoid valves, which are either fully open or fully closed. Third, this system also does not require solenoid valve pulsing, which is a technique used to modify flow rates using standard solenoid valves by rapidly opening and closing the solenoid valves (i.e., "pulsing" the valves). Pulsing solenoid valves has at least two drawbacks: (1) the resulting fluid flow is unsteady because of the pulsing of the valve, which is aesthetically undesirable; and (2) pulsing solenoid valves reduces valve life because solenoid valves have a lifetime cycle limit. Aspects of beverage dispenser 1 require significantly less valve cycles because they do not need to pulse the valves to control fluid flow, and thus the valves will last a longer time than a system that uses valve pulsing. Furthermore, the resulting dispensed fluid stream is steady because the valves are not being pulsed, which is more aesthetically pleasing to a user.

Figure 11:
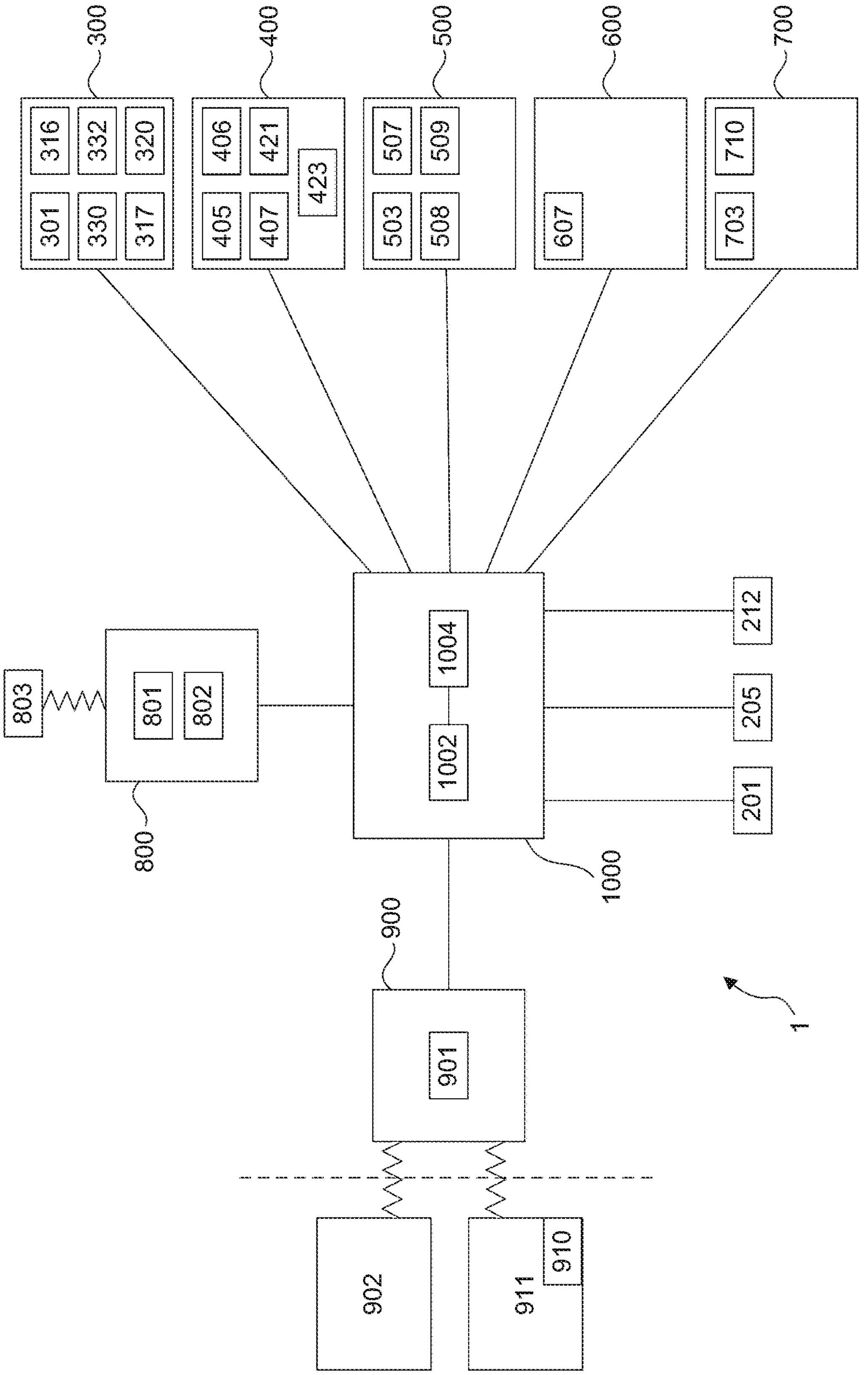
FIG. 11 is a schematic view of a control system of a beverage dispenser according to an aspect.

FIG. 11 is a system diagram of an aspect of a control system for beverage dispenser 1. At the center of the diagram is controller 1000, which has been discussed in previous sections. Controller 1000 is the central control system for beverage dispenser 1. It may comprise one or more processors connected to memory that stores operating instructions for various operations that are executed by the processor(s) of controller 1000. These instructions may include all of the operations discussed above and the methods of operation discussed below. As shown in FIG. 11, controller 1000 is connected with controllable elements of each of the five functional groups discussed above. Each functional group may include sensors (e.g., temperature sensors, fill level sensors) that transmit information to controller 1000 and controllable elements (e.g., valves, pumps) that control the operation of the functional group per the discussion above. Also shown in FIG. 11 are sensors and controllable elements that are unaffiliated with a specific functional group. For example, water supply valve 201 is controlled by controller 1000 and is not directly associated with any single functional group, but instead may be used in cooperation with any of the functional groups to dispense the corresponding beverage.

Figure 12:
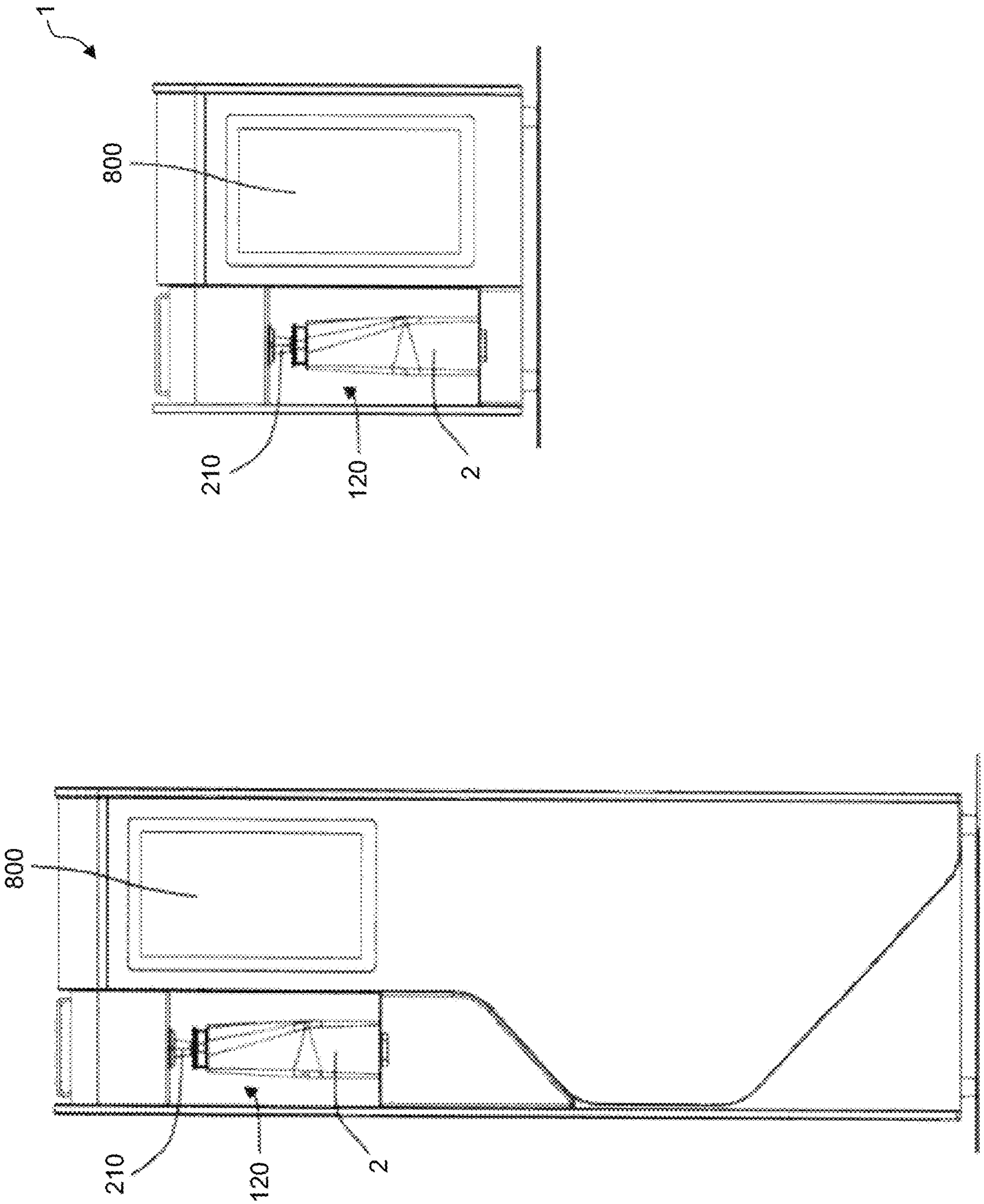
FIG. 12 is a perspective view of a beverage dispenser according to an aspect.

As best seen in FIGS. 1 and 2, beverage dispenser 1 may also include a display 800. In some aspects, as shown in FIGS. 1 and 2, display 800 may be located on the front of housing 100. Specifically, display 800 may be disposed on front wall 101 above nozzle 210 such that display 800 is visible to a user from the exterior of beverage dispenser 1. In some aspects, display 800 may be located such that it is visible to a user standing directly in front of nozzle 210. Display 800 may include a display screen 801. Display screen 801 may be any suitable type of display that is capable of displaying information. In other aspects of dispenser 1, display 800 may be positioned laterally with respect to nozzle 210 and dispensing zone 120 (see FIG. 12).

In some aspects, display screen 801 may be a touchscreen type display. This allows display screen 801 to receive user input. In some aspects where display screen 801 is a capacitive touchscreen, display screen 801 may be capable of receiving all necessary inputs needed to interact with beverage dispenser 1. In these aspects, display screen 801 may be the only user interface element on the front of beverage dispenser 1. This configuration minimizes the space needed for user interface elements by eliminating additional elements, such as buttons, switches, etc. Furthermore, a single touchscreen streamlines the exterior of beverage dispenser 1 and improves the aesthetic appearance of beverage dispenser 1.

In some aspects, display 800 may also include a camera 802. Camera 802 is configured to receive images of a region in front of beverage dispenser 1 and may be any suitable type of camera capable of receiving said images. Camera 802 is connected to controller 1000 and may be used in several different ways. First, camera 802 may enable a user to communicate information to beverage dispenser 1. For example, camera 802 can be configured (through controller 1000) to read an optical code 803 displayed by the user. Optical code 803 may be, for example, a bar code or QR code. Optical code 803 can encode various information. For example, in some aspects, a user may prepare optical code 803 with information on a user account and attach optical code 803 to a beverage container like bottle 2 displayed in FIG. 3A. After approaching beverage dispenser 1, they use camera 802 to scan optical code 803 on their beverage container, and then select and dispense a beverage. Beverage dispenser 1 charges the cost of the beverage to the user account encoded on optical code 803. This usage of optical code 803 may also extend to placing optical code 803 on other, convenient articles (e.g., a wallet, a mobile phone, etc.). Further details related to the user account are discussed below.

Camera 802 may also be used to configure beverage dispenser 1 during consumable replacement. As discussed above, concentrate container 701 may be removably replaced by a user. A user may replace concentrate container 701 when concentrate container 701 is empty or if they want to include a different type of flavoring or enhancement in beverage dispenser 1. To function properly, beverage dispenser 1 must be programmed with the type of concentrate that is present in each concentrate container 701 to properly dispense the desired flavoring or enhancement. In some aspects, a user may remove and replace concentrate container 701, and then manually enter the type of concentrate container 701 (using, for example, touchscreen display 801). In some aspects, concentrate containers 701 may include an optical code 803 that can be scanned by camera 802. This optical code 803 contains information including the type of flavoring or enhancement in concentrate container 701. Thus, instead of manually entering the information, a user may simply remove the old concentrate container 701, scan the new concentrate container 701 with camera 802, and install the new concentrate container 701. This system streamlines the replacement process and reduces errors that may be created by manually inputting the concentrate information.

Figure 13:
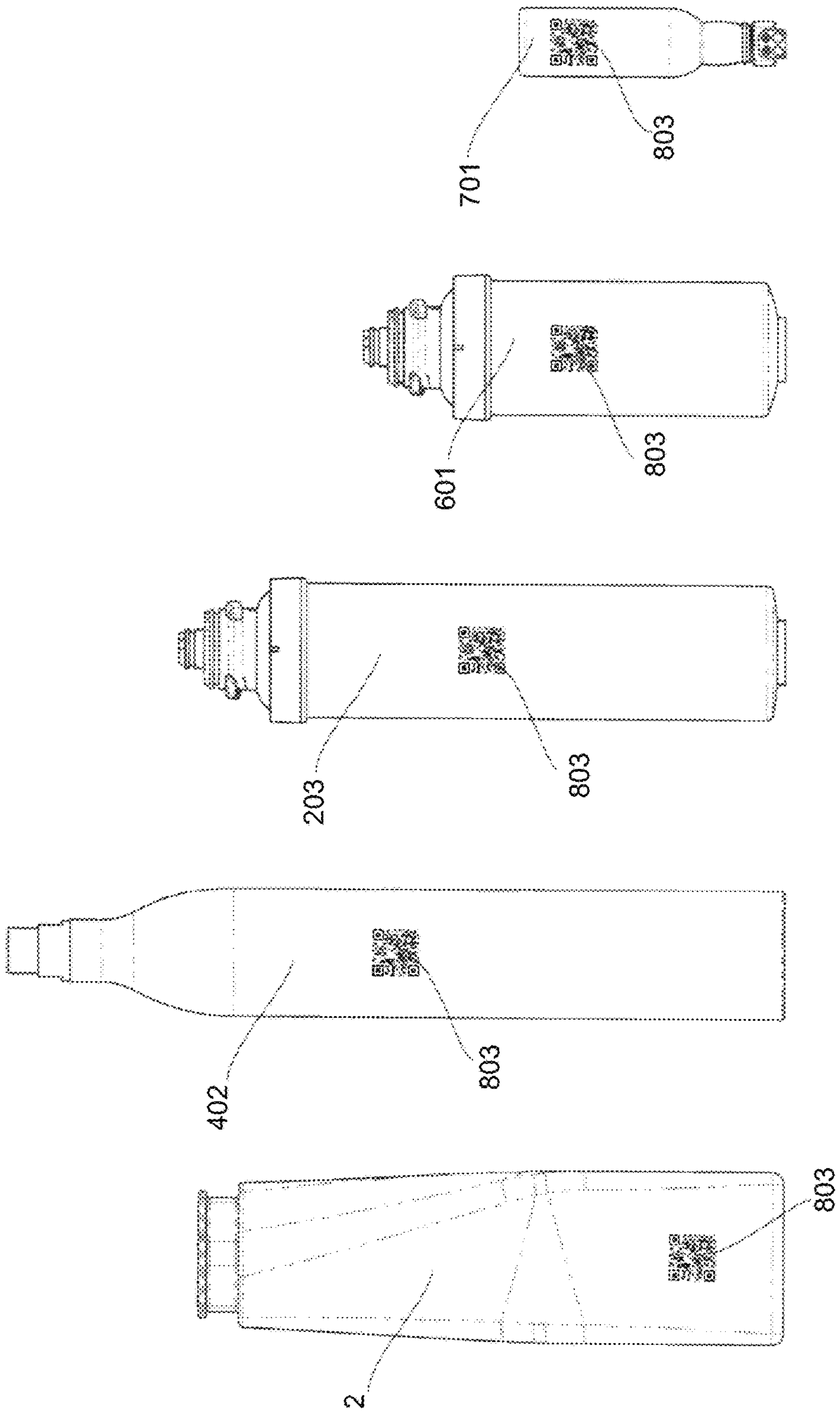
FIG. 13 is a view of examples of consumables for the beverage dispenser with an optical code printed on their external surfaces.

In reference to FIG. 13, in some aspects, in addition to beverage container 2 and concentrate container 701, optical code 803 may be present on all replaceable consumables, including alkaline chamber 601, water filter 203, and CO2 gas canister 402. The optical code on the replaceable consumables contain information about the consumable, including its content, capacity and lifetime/duration of use. Camera 802 detects the optical code 803 on the external surface of the beverage container 2, the CO2 gas canister 402, the water filter 203, the alkaline chamber 601 and the concentrate container 701, and transmit this information to controller 1000. Dispenser 1 can thereby inform user when each consumable must be replaced based on content, capacity, and lifetime. For example, controller 1000 may track total water usage by using flow readings from flow meter 205. The total water usage may be compared to lifetime water usages of various consumables (e.g., canister 402, water filter 203, or alkaline chamber 601). When total water usage reaches the lifetime water usage of one of the consumables, controller 1000 may be configured to transmit or display a replacement alert to the user.

In some aspects, camera 802 may also be used for proximity detection. For example, camera 802 may detect when a user is within a certain distance of beverage dispenser 1. This may trigger a variety of responses in beverage dispenser 1, including, for example, activating lighting on the exterior of housing 100 or activating display 800.

In some aspects, beverage dispenser 1 may include a communication system 900. Communication system 900 may include one or more transceivers 901 configured to wirelessly communicate with various networks. In some aspects, transceiver 901 may communicate with various combinations of cellular data networks, wireless internet networks, or other short range data networks using Bluetooth or near field communication. These networks are referred to collectively as network 902 herein.

In some aspects, communication system 900 may be configured to transmit maintenance, service, and usage data or information through network 902 to a user or maintenance technician. The information may include system errors or faults as well as notifications that an onboard consumable is empty and needs replacement. Users or maintenance technicians may be notified by email, text message, or any other suitable electronic message.

In some aspects, communication system 900 may be configured to communicate with an application 910 installed on a mobile device 911 of a user. Application 910 may include a user interface similar to the user interface displayed on display 800 (discussed in detail below). In some aspects, application 910 may reproduce some of the information and input elements available on display 800. In some aspects, application 910 may reproduce all of the information and input elements available on display 800. In these aspects, a user may use application 910 in combination with display 800 to select and to order a beverage. Alternatively, the user may use application 910 to order and dispense a beverage without physically interacting with beverage dispenser 1 and without touching the display 800. The user interfaces and corresponding user interactions associated with display 800 and application 910 will be discussed in detail below.

Methods of dispensing a beverage from various aspects of beverage dispenser 1 will be discussed below. Several different example beverages will be used to illustrate the operation of beverage dispenser 1. These example beverages and their corresponding beverages are not intended to be limiting examples of available beverages from beverage dispenser 1. A skilled artisan would appreciate how to modify and combine the methods below to create any desired beverage within the capabilities of beverage dispenser 1.

A first method of dispensing will discuss how to dispense chilled, still water with a single flavoring—for example, lime flavoring. After receiving the beverage order, controller 1000 opens water supply valve 201 and activates pump 301 to pump water through first chilling path 303 and into chilling coil 314. The now chilled water exits chilling coil 314 and flows through first chilled water line 302 after chilled water valve 330 is opened by controller 1000. Because the dispensed beverage is to be served chilled, ambient water valve 322 is not opened and ambient water is not permitted to flow to nozzle 210. However, if an intermediate temperature water was desired, controller 1000 could open ambient water valve 322 to allow ambient water to flow to nozzle 210.

At the same time as chilled water is being dispensed, controller 1000 activates container pressurization valve 710 (if not already open) and concentrate pump 703 and begins pumping both the desired concentrate (lime flavor) from concentrate container 701 as well as alkaline water from alkaline chamber 601 through concentrate pump 703. In aspects as shown in FIGS. 5B and 10B, alkaline water is pumped by activating alkaline pump 704 in addition to concentrate pump 703. In aspects with flow regulator 740, the ratio of alkaline water to gas is controlled by flow regulator 740 as discussed above. The now-diluted concentrate is pumped to nozzle 210 for the desired length of time depending on the desired quantity of beverage desired and at a pump 703 rotational speed corresponding to the strength of the concentrate in the dispensed beverage. The chilled water and the alkaline diluted concentrate are blended in and dispensed from nozzle 210. After the beverage is dispensed, controller 1000 closes after drip valve 212 and any other activated pumps and valves to cease dispensing the beverage.

A second method of dispensing will discuss how to dispense a lightly sparkling beverage with two concentrate flavorings—lemon and caffeine. With reference to FIG. 5A, after receiving the beverage order, controller 1000 opens water supply valve 201 and activates pump 301 to pump water through first chilling path 303 and into chilling coil 314. Controller 1000 also opens carbonation water valve 406, which routes the chilled water through carbonator chambers 408, creating sparkling water. Gas valve 405 is also opened at the same time (if not already opened) to allow gas to blend with the chilled water in chilled water line 404.

In aspects like the one shown in FIG. 7A, because the desired level of carbonation is less than maximum carbonation, controller 1000 also opens one or more of chilled water valves 421 and/or 423. This adds chilled water to the flow of sparkling water flowing to nozzle 210 in carbonated water path 412, thus reducing the percentage of carbonated gas that is dissolved. Any combination of valves 421, and 423 may be opened depending on the desired level of carbonation.

At the same time as sparkling water is being dispensed, controller 1000 opens gas valve 710 and activates the appropriate concentrate pumps 703 and begins pumping both the desired concentrates (lemon flavor and caffeine) from concentrate containers 701 as well as alkaline water from alkaline chamber 601. If necessary, depending on the aspect, alkaline pump 704 may also be activated at this time. The diluted concentrates are pumped to nozzle 210 for the desired length of time depending on the desired quantity of beverage user wants to dispense. Pumps 703 may rotate at two different speeds, depending upon the relative strength of the two concentrates in the dispensed beverage. For a beverage with high lemon taste and a hint of caffeine, the speed of pump 703 in correspondence to the concentrate container with lemon will be high, while the speed of the pump 703 (and, if applicable, pump 704) corresponding to the concentrate container with caffeine will rotate at very low spin. The lightly sparkling water and diluted concentrates are blended in and dispensed from nozzle 210. After the beverage is dispensed, controller 1000 closes after drip valve 212 and any other activated pumps and valves to cease dispensing the beverage.

In aspects such as those like the one shown in FIGS. 7B and 7C, production of variable levels of sparkling water differs than the aspect discussed immediately above. In these aspects, one or both of gas pressurization valve 433 is opened to allow gas to flow into carbonation system 430. The operation of carbonation system 430 is discussed above, with controller 1000 able to control the carbonation level by selectively opening one or both of gas pressurization valves 433 and also the opening of automatic flow regulator 435. After the resulting sparkling gas is produced in carbonator chamber 408, the dispensing process proceeds as described in the above paragraphs.

Various examples of the arrangement and operation of the user interface will be discussed with reference to FIGS. 14-16. As discussed above, users may order beverages from beverage dispenser 1 using a user interface 2000 displayed on display 800. User interface 2000 may also be displayed on application 910 installed on a mobile device of a user. A user may use either display 800 or application 910 to order beverages from beverage dispenser 1 as discussed below.

Figure 14:
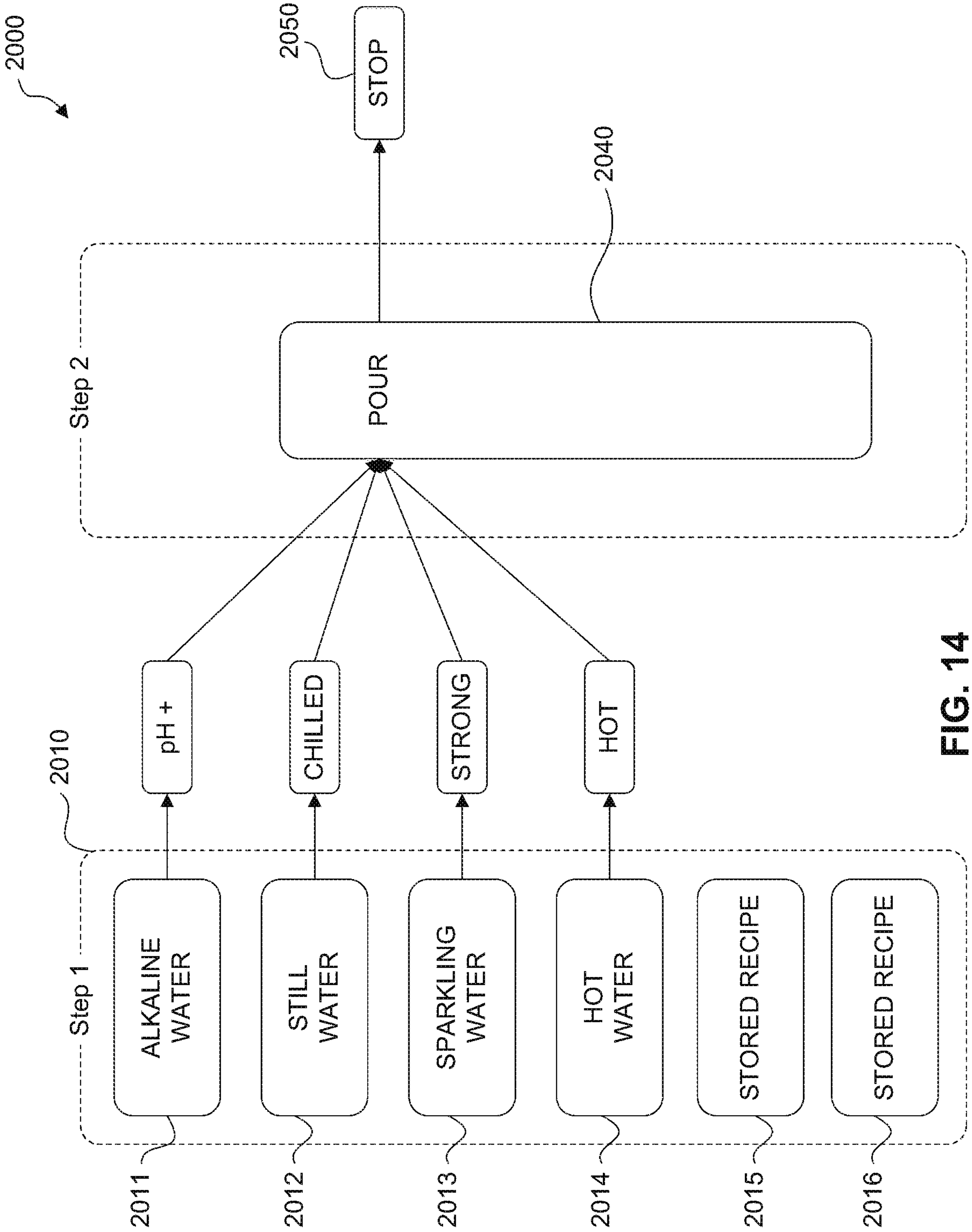
FIG. 14 is a flow chart of a user interface of a beverage dispenser according to an aspect.

An example of a simplified user interface 2000 is shown in FIG. 14. The ordering process moves from left to right on FIG. 14, beginning with an initial beverage selection from beverage group 2010. Beverage group 2010 may include any number of beverages. For example, in FIG. 14, beverage group 2010 includes selectable beverages that include alkaline water button 2011, still water button 2012, sparkling water button 2013, hot water button 2014, a first stored beverage button 2015, and a second stored beverage button 2016. First stored beverage button 2015 and second stored beverage button 2016 may represent preset beverage recipes or previous recipes that have been saved by the user or designated recipes pre-programmed in the dispenser's controller 1000. A user selects one of these options to proceed to the next ordering step. In some aspects, a user may directly touch one of these beverage buttons if display 800 or the mobile device running application 910 includes touchscreen capability.

In the simplified user interface 2000 of FIG. 14, there are no available customization options for the beverage selected in the first step. Thus, the second step is selection of the pour button 2040. Selection of pour button 2040 begins dispensing of the beverage. In some aspects, pour button 2040 only needs to be selected or activated (e.g., pushed or touched) once to activate dispensing, and does not need to be held to continue dispensing the beverage. In the user interface of FIG. 14, dispensing continues until a stop button 2050 is selected (e.g., by pushing or touching). Thus, in some aspects a beverage may be dispensed with three command inputs from the user: a selection of a beverage from group 2010, selection of pour button 2040 to start dispensing, and selection of stop button 2050 to stop dispensing. In some aspects, there may also be a shutdown timer that stops dispensing a predetermined period of time after pour button 2040 has been selected. In certain aspects of dispenser 1, dispensing stops after a desired quantity of beverage has been dispensed. Flow meter 205 and controller 1000 allows for volume calibration of the beverage dispensed. Volume calibration may be pre-activated, before pour button 2040 has been selected, by either display 800 or application 910.

In some aspects, the various inputs and buttons discussed above may be simultaneously visible on display 800 or application 910. In some aspects, only the buttons and inputs relevant to the current input stage may be visible. For example, in the first step where the user selects the beverage type from beverage group 2010, only the elements of beverage group 2010 may be visible. After a specific beverage is selected, pour button 2040 may then become visible. And after pour button 2040 is pressed, stop button 2050 may become visible. After stop button 2050 has been pressed user interface 2000 may reset to an initial stage after a predetermined time period has passed. For example, user interface 2000 may reset to displaying only beverage group 2010 ten seconds after stop button 2050 has been pressed. In some aspects, a similar timer may operate whenever no input is received. For example, if no input is received for 15 or 30 seconds, user interface 2000 may reset to displaying only beverage group 2010.

As discussed above, the elements of FIG. 14 may be present on either or both of display 800 and application 910. Furthermore, in some aspects, a user may use either or both of display 800 and application 910 to input commands. Thus, the steps described above may be executed entirely on display 800, entirely on application 910, or split between display 800 and application 910. For example, a user may select a beverage from group 2010 and select pour button 2040 on display 800, but may then stop dispensing of the beverage by selecting stop button 2050 on application 910. In another example, a user may select a beverage from beverage group 2010 on display 800, select pour button 2040 on application 910, and stop dispensing of the beverage by selecting stop button 2050 on display 800. Any other desired combination of control inputs distributed between display 800 and application 910 is also possible. In some aspects user can pre-select the quantity of beverage to be dispensed either on the display 800 or on application 910.

In aspects where application 910 can be used to either partially or fully interact with user interface 2000, the user may be required to authenticate application 910 with a specific beverage dispenser 1 before using application 910 to interact with beverage dispenser 1. In some aspects this authentication may occur automatically when application 910 is brought within a predetermined distance from beverage dispenser 1 and communicates with beverage dispenser 1 via communication system 900. In some aspects, this authentication may require action by the user in application 910 such as, for example, selecting a specific beverage dispenser 1 to authenticate. In some aspects, this authentication may include generating and display optical code 803 with application 910 such that camera 802 reads optical 903 from application 910. In any of these aspects, application 910 may be associated with a specific user account, which may be used as part of the authentication process. Other uses of the user account are discussed below.

Figure 15:
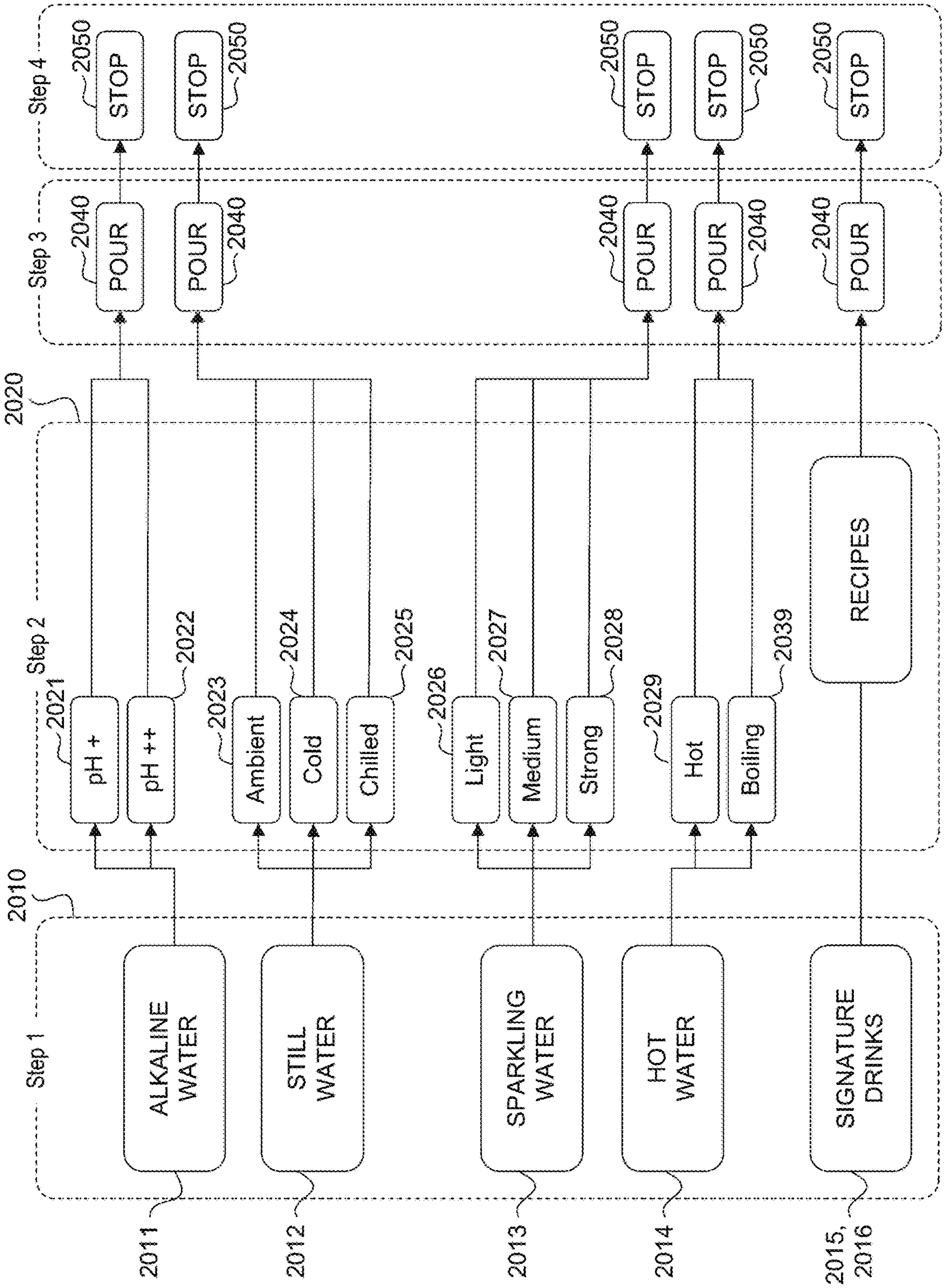
FIG. 15 is a flow chart of a user interface of a beverage dispenser according to an aspect.

FIG. 15 illustrates an aspect of user interface 2000. Like what was shown in FIG. 14, FIG. 15 begins with a selection of a beverage from beverage group 2010. However, after selecting a beverage, a customization group 2020 containing beverage options tailored for that beverage is displayed for selection. Customization group 2020 include specific options related to the beverage selected from beverage group 2010. For example, if alkaline water button 2011 is selected, the options displayed in customization group 2020 may include a PH+ button 2021 and a PH++ button 2022, representing a lower and a higher alkalinity level for the selected alkaline water, respectively. If still water button 2012 is selected, customization group 2020 may include an ambient button 2023, a cold button 2024, and a chilled button 2025, representing three different temperature settings for the still water. If sparkling water button 2013 is selected, customization group 2020 may include a light button 2026, a medium button 2027, and a strong button 2028, representing three different levels of carbonation of the water. If hot water button 2014 is selected, customization group 2020 may include a hot button 2029 and a boiling button 2039, representing two different hot water temperature levels. There are generally no customization options available for saved recipes such as first stored beverage button 2015 or second stored beverage recipe 2016, although aspects of user interface 2000 may allow a user to modify saved recipes by presenting customization options. The customization options discussed here are examples only and any number and type of customization options may be associated with each selected beverage, assuming beverage dispenser 1 is capable of dispensing the beverage in accordance to the selected option. In some aspects, a specific customization option may be preselected after a beverage from beverage group 2010 is selected. This default selection may assist a user in quickly ordering a beverage by reducing the number of inputs required from the user.

After selection of a beverage from beverage group 2010 and a customization option from customization group 2020, pour button 2040 may become visible. The user selects pour button 2040 and stop button 2050 in the same manner discussed above with respect to the aspect of user interface of FIG. 14.

Figure 16:
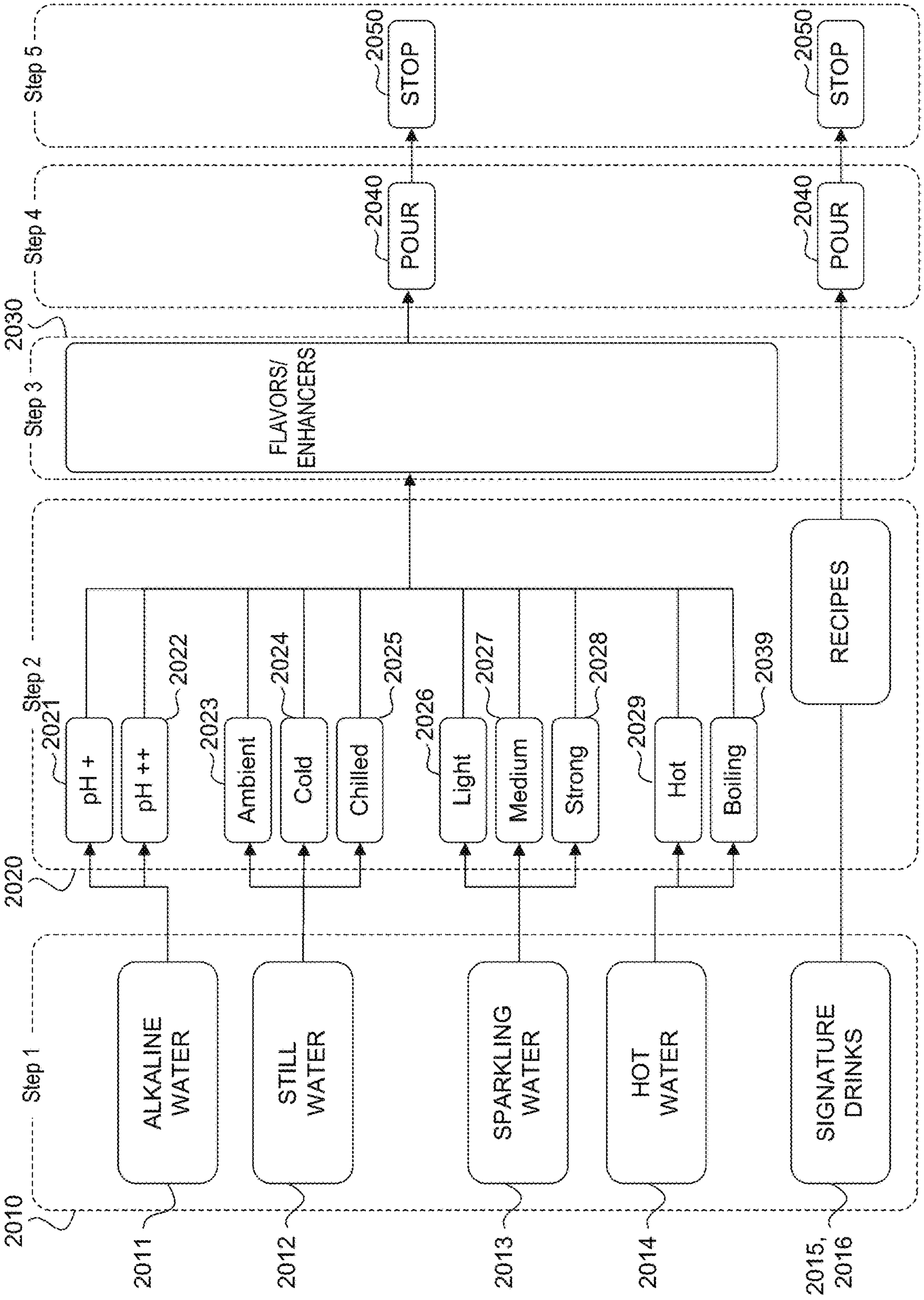
FIG. 16 is a flow chart of a user interface of a beverage dispenser according to an aspect.

FIG. 16 illustrates a different aspect of user interface 2000. This aspect includes beverage group 2010 and customization options 2020 that function in the same manner as discussed above with respect to FIG. 15. After customization options are selected from group 2020, a flavoring and enhancement group 2030 is presented. Flavoring and enhancement group 2030 displays a selection of all flavorings or enhancements that are available onboard beverage dispenser 1. A user may select any combination of the available flavorings and enhancements from flavoring and enhancement group 2030 to add to their beverage. In some aspects, each option presented in flavoring and enhancement group 2030 may include multiple concentration levels: from a very high concentration to very low concentration (i.e., a "hint" of flavoring). For example, if a lime flavor is present in flavoring and enhancement group 2030, a user may be able to select from one, two, three, or more levels of lime concentration flavoring in their beverage. In some aspects, there are as many as 16 types of flavors, enhancers or additives, each of which can be dispensed in any combination and in any concentration level.

In some aspects, beverage dispenser 1 may be configured to limit the level or types of flavorings that may be added to a selected beverage. For example, selecting certain combinations of flavorings may be prohibited based on undesirable taste produced in the resulting beverages when the flavorings are combined. Other flavoring selections may be prohibited based on safety reasons. For example, beverage dispenser 1 may limit the maximum concentration and/or the maximum amount of caffeine that is able to be added to a beverage to a concentration and an amount that is considered safe for the beverage volume. After the desired flavorings and enhancements are added, the user selects pour button 2040 and stop button 2050 in the same manner discussed above with respect to the aspect of user interface of FIG. 14.

In any configuration and aspect, a user may be prompted for payment by user interface 2000 before being able to select pour button 2040. The amount charged for payment may be based on several different factors, including the type of beverage selected and the number and type of flavorings and enhancements added to the beverage. In some aspects, certain beverages may be free to dispense. For example, plain chilled water may be free to dispense.

Payment for beverages dispensed from beverage dispenser 1 may be accomplished in several different ways. In some aspects, beverage dispenser 1 may accept digital payment using communication system 900 from a suitable digital payment source that can communicate payment wirelessly. In some aspects, a user may pre-purchase a beverage credit in the form of a sticker, beverage container, or other item that includes optical code 803. The user scans optical code 803 with camera 802, which enables use of the beverage credit at beverage dispenser 1. In some aspects, this beverage credit may allow for purchase of multiple beverages, in which case the user may scan optical code 803 and purchase beverages until the credit is exhausted. In these aspects, beverage dispenser 1 may communicate with a network 902 using communication system 900 to update a record of the beverage credit associated with optical code 803 stored on a remote server each time a beverage is dispensed. This allows the user to use their credit at any beverage dispenser 1 that is connected to the network because any of those dispenser can check and deduct a beverage cost from the remotely stored credit.

In some aspect, a user may have a user account affiliated with payment information. In these aspects the user may input their account information into beverage dispenser 1 to purchase their beverage. Beverage dispenser 1 uses communication system 900 to communicate with a network 902 to verify the user account information and to charge the account with the beverage cost. In some aspects, the user can input their user account information into application 910, which can then communicate with beverage dispenser 1 using communication system 900 to authenticate the user account. In some aspects, application 910, after user has selected the preferred beverage on the application and paid for using user's own account, generates and displays optical code 803 which can be shown to start the dispenser using camera 802 instead of communicating through communication system 900. In some aspects, application 910 may display the locations of the nearest beverage dispensers 1 that will accept payment from the user to dispense beverages.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A method of dispensing a beverage from a beverage dispenser, comprising:

receiving water from a water source connected to a housing of the beverage dispenser;

pumping a high ratio concentrate from a concentrate container disposed in the housing to a nozzle disposed on the housing using a pump disposed in the housing and fluidly connected to the concentrate container;

pumping alkaline water having a pH greater than 7.00 to the nozzle such that the concentrate and alkaline water are blended together before arriving at the nozzle to form a first concentrate combination;

pressurizing the concentrate container with a pressurized gas from a gas source to assist in the pumping of the high ratio concentrate to the nozzle;

dispensing the first concentrate combination from the nozzle;

cooling a water bath of a water chiller disposed in the housing using a cooling element disposed in the water bath;

cooling the water from the water source by routing the water through a chiller coil disposed in the water bath to form a chilled water;

receiving the chilled water at a carbonator chamber disposed in the housing;

receiving pressurized gas from the gas source at the carbonator chamber;

combining the chilled water and the pressurized gas such that at least some of the pressurized gas is dissolved in the chilled water to form a sparkling water;

receiving the sparkling water at the nozzle;

combining the sparkling water and the first concentrate combination in the nozzle to form the beverage; and dispensing the beverage from the nozzle.

2. The method of claim 1, further comprising:

cooling the water from the water source by routing the water through a water chiller disposed in the housing;

receiving the chilled water at the nozzle;

combining the chilled water and the first concentrate combination in the nozzle to form the beverage; and dispensing the beverage from the nozzle.

3. The method of claim 1, further comprising:

selectively opening at least one of: a first chilled water valve disposed in a chilled water line fluidly connecting the chilling coil and the nozzle, a second chilled water valve disposed in a second chilled water line fluidly connecting the chilling coil and the nozzle, and a third chilled water valve disposed in a third chilled water line fluidly connecting the chilling coil and the nozzle;

wherein the opening of the at least one of the first chilled water valve, the second chilled water valve, and the third chilled water valve is determined based on the amount of chilled water needed to reduce a concentration of the pressurized gas in the resulting beverage dispensed at the nozzle to a desired concentration level.

4. The method of claim 1, further comprising:

receiving the alkaline water from the alkaline chamber at the nozzle through a separate fluid line that is not connected to the pump; and combining the alkaline water with at least the first concentrate combination to form the beverage.

5. The method of claim 1, further comprising:

receiving a source of hot water from a hot water heater disposed in the housing at the nozzle; and combining the hot water with at least the first concentrate combination to form the beverage.

6. The method of claim 1, further comprising:

detecting a level of the concentrate in the concentrate container using a concentrate container sensor; and transmitting an alert through a transceiver to an external network when the detected level of the concentrate container is empty.

7. The method of claim 1, further comprising:

filtering the water from the water source through a water filter disposed in the housing before the water is received at the nozzle.

8. A method of dispensing a beverage from a beverage dispenser, comprising:

receiving a desired beverage temperature at the beverage dispenser;

adjusting a temperature of a beverage to be dispensed to match the desired beverage temperature by mixing water from a water source received at the beverage dispenser with chilled water from a water chilling system disposed in a housing of the beverage dispenser, wherein the mixing occurs at or before a nozzle of the beverage dispenser, and wherein both the water from the water source and the chilled water are pumped simultaneously by a single water pump disposed in the housing.

9. The method of claim 8, further comprising:

receiving a source of hot water from a hot water heater disposed in the housing at the nozzle; and adjusting the temperature of the beverage to be dispensed to match the desired temperature by mixing the hot water with at least one of the water and the chilled water.

10. A method of dispensing a beverage from a beverage dispenser, comprising:

receiving a desired carbonation level at the beverage dispenser;

producing carbonated water by combining gas from a gas source with water from a water source at the beverage dispenser;

adjusting a carbonation level of a beverage to be dispensed to match the desired carbonation level by mixing the carbonated water with chilled water from a water chilling system disposed in the housing, wherein a flow rate of the chilled water is selected to produce the desired carbonation level in the beverage, and wherein both the water from the water source and the chilled water are pumped simultaneously by a single water pump disposed in the housing.

11. A method of dispensing a beverage from a beverage dispenser, comprising:

receiving water from a water source connected to a housing of the beverage dispenser; pumping a high ratio concentrate from a concentrate container disposed in the housing to a nozzle disposed on the housing using a pump disposed in the housing and fluidly connected to the concentrate container;

pumping alkaline water having a pH greater than 7.00 to the nozzle such that the concentrate and alkaline water are blended together before arriving at the nozzle to form a first concentrate combination;

pressurizing the concentrate container with a pressurized gas from a gas source to assist in the pumping of the high ratio concentrate to the nozzle;

dispensing the first concentrate combination from the nozzle;

detecting a level of the concentrate in the concentrate container using a concentrate container sensor; and transmitting an alert through a transceiver to an external network when the detected level of the concentrate container is empty.

* * * * *